United States Patent
Lee et al.

(10) Patent No.: US 12,136,202 B2
(45) Date of Patent: Nov. 5, 2024

(54) CONTENT ADAPTIVE FILTERING VIA RINGING ESTIMATION AND SUPPRESSION

(71) Applicant: ATI Technologies ULC, Markham (CA)

(72) Inventors: Keith Lee, Markham (CA); Edward George Callway, Markham (CA); Isobel Lees, Toronto (CA)

(73) Assignee: ATI Technologies ULC, Markham (CA)

(\*) Notice: Subject to any disclaimer, the term of this patent is extended or adjusted under 35 U.S.C. 154(b) by 0 days.

(21) Appl. No.: 17/488,982

(22) Filed: Sep. 29, 2021

(65) Prior Publication Data
US 2023/0096874 A1 Mar. 30, 2023

(51) Int. Cl.
*G06V 10/25* (2022.01)
*G06T 5/80* (2024.01)

(52) U.S. Cl.
CPC .............. *G06T 5/80* (2024.01); *G06V 10/25* (2022.01); *G06T 2207/20024* (2013.01); *G06T 2207/20224* (2013.01)

(58) Field of Classification Search
CPC ....... G06T 5/002; G06T 15/503; G06T 5/001; G06V 10/30
See application file for complete search history.

(56) References Cited

U.S. PATENT DOCUMENTS

| | | | |
|---|---|---|---|
| 5,819,035 A * | 10/1998 | Devaney | H04N 9/646 382/268 |
| 8,200,044 B2 | 6/2012 | Callway | |
| 2002/0191701 A1* | 12/2002 | O'Brien, Jr. | H04N 19/86 375/E7.19 |
| 2006/0110062 A1* | 5/2006 | Chiang | H04N 19/16 375/E7.161 |

(Continued)

FOREIGN PATENT DOCUMENTS

CN 101237523 B * 3/2013

OTHER PUBLICATIONS

Hou et al., "Reduction of image coding artifacts using spatial structure analysis," 2007 9th International Symposium on Signal Processing and Its Applications, Sharjah, 2007, pp. 1-4, doi: 10.1109/ISSPA.2007.4555349.*

*Primary Examiner* — Guillermo M Rivera-Martinez
(74) *Attorney, Agent, or Firm* — Kowert, Hood, Munyon, Rankin & Goetzel, P.C.; Rory D. Rankin

(57) ABSTRACT

Systems, apparatuses, and methods for implementing content adaptive processing via ringing estimation and suppression are disclosed. A ring estimator estimates the amount of ringing when a wide filter kernel is used for image processing. The amount of ringing can be specified as an under-shoot or an over-shoot. A blend factor calculation unit determines if the estimated amount of ringing is likely to be visually objectionable. If the ringing is likely to be visually objectionable, then the blend factor calculation unit generates a blend factor value to suppress the objectionable (Continued)

ringing. The blend factor value is generated for each set of source pixels based on this determination. The blend factor value is then applied to how the blending is mixed between narrow and wide filters for the corresponding set of source pixels. The preferred blending between the narrow and wide filters is changeable on a pixel-by-pixel basis during image processing.

20 Claims, 20 Drawing Sheets

(56) References Cited

U.S. PATENT DOCUMENTS

| | | | | |
|---|---|---|---|---|
| 2007/0152990 | A1* | 7/2007 | Callway | G06T 7/42 |
| | | | | 345/204 |
| 2010/0027905 | A1* | 2/2010 | Zhang | G06T 5/70 |
| | | | | 348/241 |
| 2014/0009469 | A1* | 1/2014 | Shin | G06T 5/73 |
| | | | | 345/428 |
| 2014/0056537 | A1* | 2/2014 | Srinivasan | G06T 5/002 |
| | | | | 382/261 |
| 2014/0211049 | A1* | 7/2014 | Tsutsui | H04N 25/68 |
| | | | | 348/246 |
| 2014/0369613 | A1* | 12/2014 | Avadhanam | H04N 19/176 |
| | | | | 382/233 |
| 2020/0077090 | A1* | 3/2020 | Wennersten | H04N 19/80 |
| 2022/0384544 | A1* | 12/2022 | An | H10K 59/353 |

* cited by examiner

| Input | Output | Input | Output | Input | Output | Input | Output | Input | Output |
|---|---|---|---|---|---|---|---|---|---|
| 0 | 1023 | 20 | 28 | 40 | 18 | 60 | 7 | | |
| 1 | 750 | 21 | 27 | 41 | 18 | 61 | 7 | | |
| 2 | 512 | 22 | 27 | 42 | 18 | 62 | 6 | | |
| 3 | 340 | 23 | 26 | 43 | 17 | 63 | 6 | | |
| 4 | 256 | 24 | 26 | 44 | 16 | 64 | 5 | | |
| 5 | 205 | 25 | 26 | 45 | 15 | 65 | 5 | | |
| 6 | 180 | 26 | 26 | 46 | 14 | 66 | 4 | | |
| 7 | 146 | 27 | 25 | 47 | 13 | 67 | 4 | | |
| 8 | 120 | 28 | 25 | 48 | 12 | 68 | 4 | | |
| 9 | 80 | 29 | 24 | 49 | 11 | 69 | 4 | | |
| 10 | 64 | 30 | 24 | 50 | 10 | 70 | 3 | | |
| 11 | 50 | 31 | 23 | 51 | 10 | 71 | 3 | | |
| 12 | 36 | 32 | 22 | 52 | 9 | 72 | 3 | | |
| 13 | 35 | 33 | 22 | 53 | 9 | 73 | 2 | | |
| 14 | 34 | 34 | 22 | 54 | 8 | 74 | 2 | | |
| 15 | 33 | 35 | 21 | 55 | 8 | 75 | 2 | | |
| 16 | 32 | 36 | 21 | 56 | 8 | 76 | 2 | | |
| 17 | 31 | 37 | 20 | 57 | 8 | 77 | 1 | | |
| 18 | 30 | 38 | 20 | 58 | 8 | 78 | 1 | | |
| 19 | 29 | 39 | 19 | 59 | 7 | 79 | 1 | >79 | 1 |

| Sign-absNLRing (10-bits) | -512 | -20 | 0 | 16 | 32 | 48 | 64 | 80 |
|---|---|---|---|---|---|---|---|---|
| BF1 (6-bits) | 0 | 12 | 63 | 63 | 56 | 50 | 20 | 0 |

Pivot Points of PWL

← 1220

| Sign-absNLRing (10-bits) | -10 | -9 | -8 | -7 | -6 | -5 | -4 | -3 | -2 | -1 | 0 |
|---|---|---|---|---|---|---|---|---|---|---|---|
| BF1 (6-bits) | 38 | 40 | 43 | 45 | 48 | 50 | 53 | 55 | 58 | 60 | 63 |

← 1230

| Sign-absNLRing (10-bits) | 17 | 18 | 19 | 20 | 21 | 22 | 23 | 24 | 25 | 26 | 27 |
|---|---|---|---|---|---|---|---|---|---|---|---|
| BF1 (6-bits) | 63 | 62 | 62 | 61 | 61 | 60 | 60 | 60 | 59 | 59 | 58 |

1905
Receive, by a Blend Factor Calculation Unit, Pixel Data

1910
Analyze the Pixel Data to Generate a Measure of the Flatness of the Pixel Data 1915
Generate a Value of an Intermediate Blend Factor which is Inversely Proportional to the Measure of Flatness

FIG. 19

CONTENT ADAPTIVE FILTERING VIA RINGING ESTIMATION AND SUPPRESSION

BACKGROUND

Description of the Related Art

Images and video frames undergo various stages of processing within an image, graphics, or video processing pipeline. When undergoing processing, the image and video frames can be encoded in different color spaces, with red, green, and blue (RGB) and luma-chroma (YCbCr) two of the more common color spaces. Also, the image/video frame can be encoded in linear or non-linear space, which can impact how the image/frame is processed. In some cases, an image is referred to as being perceptual quantization (PQ) encoded, which means the image is in non-linear space. It is noted that when an image is described as being "gamma/PQ encoded" or having "gamma/PQ encoding", this implies that the image is in non-linear space.

Ringing can occur in digital image processing, creating undesired ringing artifacts. As used herein, the term "ringing" is defined as the generation of artifacts that appear as spurious pixel values near sharp edges or discontinuities in the input pixel data of an image or video frame. Ringing is often introduced to an image near sharp transitions in the original pixel values after different types of image processing algorithms have processed the image. Depending on the image and the processing algorithm, ringing artifacts can vary from desirable to unnoticeable to annoying.

BRIEF DESCRIPTION OF THE DRAWINGS

The advantages of the methods and mechanisms described herein may be better understood by referring to the following description in conjunction with the accompanying drawings, in which:

FIG. 11 is one implementation of a LUT for converting non-linear ring estimates into values for modifying a second intermediate blend factor.

FIG. 12 shows examples of tables representing a piecewise linear (PWL) function in accordance with one implementation.

FIG. 19 is a generalized flow diagram illustrating one implementation of a method for suppressing ringing based on a measure of flatness for a region.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing content adaptive filtering via ringing estimation and suppression are disclosed herein. In one implementation, a ring estimator estimates the amount of ringing when a wide filter kernel is used for image processing. The amount of ringing can be specified as an under-shoot or an over-shoot. A blend factor calculation unit determines if the estimated amount of ringing is likely to be visually objectionable. If the estimate of ringing is likely to be visually objectionable, then the blend factor calculation unit generates a blend factor value to suppress the objectionable ringing. The blend factor value is generated for each set of source pixels based on this determination. The blend factor value is then applied to how the blending is mixed between a narrow filter and a wide filter during image processing for the corresponding set of source pixels. The preferred blending between the narrow filter and the wide filter is changeable for each set of source pixels during image processing. Also, in one implementation, the blend factor value is changeable for each destination pixel.

Figure 1:
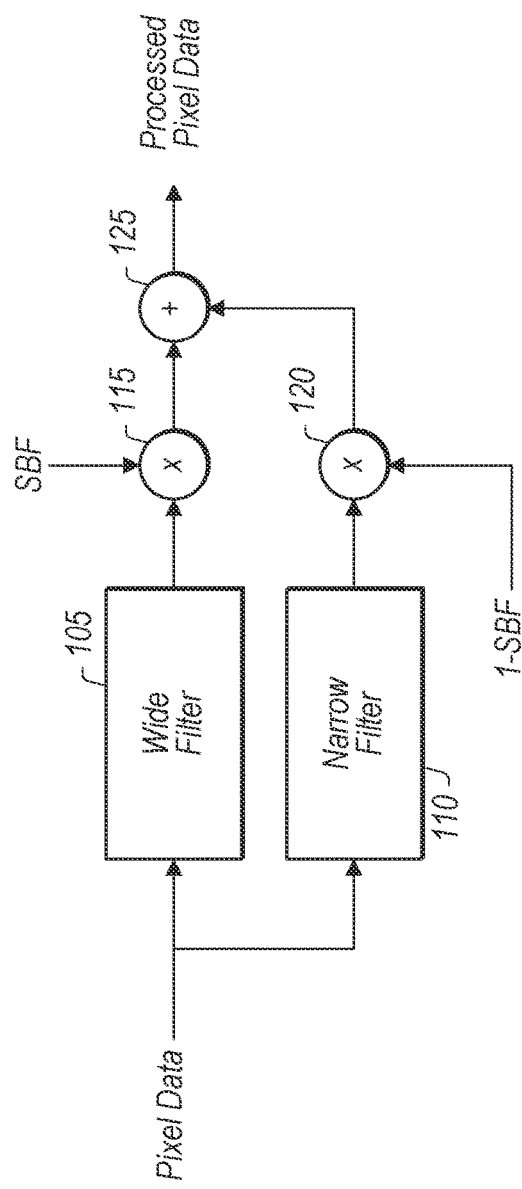
FIG. 1 is a block diagram of one implementation of a content adaptive image processing mechanism.

Referring now to FIG. 1, a block diagram of one implementation of a content adaptive image processing mechanism 100 is shown. Content adaptive image processing mechanism 100 receives an input image or video frame in any suitable format. The pixel data of the image/frame can be in a linear or non-linear (i.e., gamma or perceptual quantizer (PQ) encoded) format, RGB or YCbCr color space, or other formats and/or color spaces. In some cases, the input image can be converted to a different format or color space before being converted back to the original format and color space afterward. In one implementation, content adaptive image processing mechanism 100 is a scaler mechanism which scales (e.g., upscales, downscales) the input pixel data. In other implementations, content adaptive image processing mechanism 100 performs other types of processing (e.g., sharpening) of the input pixel data.

As shown in FIG. 1, content adaptive image processing mechanism 100 includes two filters—wide filter 105 and narrow filter 110. In other implementations, content adaptive image processing mechanism 100 can include more than two different types of filters. In the implementation shown in FIG. 1, wide filter 105 filters the input pixel data using a relatively high number of taps while narrow filter 110 filters the input pixel data using a relatively low number of taps. For example, in one implementation, wide filter 105 is a 6-tap filter while narrow filter 110 is a 2-tap filter. In other implementations, wide filter 105 and/or narrow filter 110 can have other numbers of taps. As used herein, the term "wide filter" is defined as a filter having a first number of taps, where the first number of taps is greater than a first threshold. The first threshold can vary from implementation to implementation. The number of taps refers to filter taps which corresponds to the number of coefficients that are applied to (i.e., multiplied by) values of pixels or sub-pixels of the input pixel data and then summed together. Also, as used herein, the term "narrow filter" is defined as a second filter having a second number of taps, where the second number of taps is less than a second threshold. The value of the second threshold can vary from implementation to implementation.

The output of wide filter 105 is coupled to multiplier 115 to be multiplied by a scaled blend factor (SBF), while the output of narrow filter 110 is coupled to multiplier 120 to be multiplied by (1−SBF). The outputs of multiplier 115 and 120 are added together by adder 125, with the output of adder 125 being the processed pixel data. In other implementations, SBF may take on other ranges besides (0-1) and the SBF may be applied in other suitable manners to the outputs of wide filter 105 and narrow filter 110 in these implementations. SBF is generated to suppress visibly annoying ringing that is estimated to be produced by the output of wide filter 105. Throughout the remainder of this disclosure, different techniques for determining how to generate SBF will be presented. These techniques are based on a variety of factors, such as determining the estimated amount of ringing, determining the visual impact of the ringing, and other factors. Also, it should be understood that the structure and components of content adaptive image processing mechanism 100 are merely indicative of one particular implementation. Other content adaptive image processing mechanisms with other components structured in other suitable manners will also be presented throughout this disclosure. For example, in another implementation when employing a two-dimensional (2D) non-separable filter, a single blend factor is calculated based on a set of pixels in two dimensions instead of calculating one vertical blend factor and one horizontal blend factor.

Figure 2:
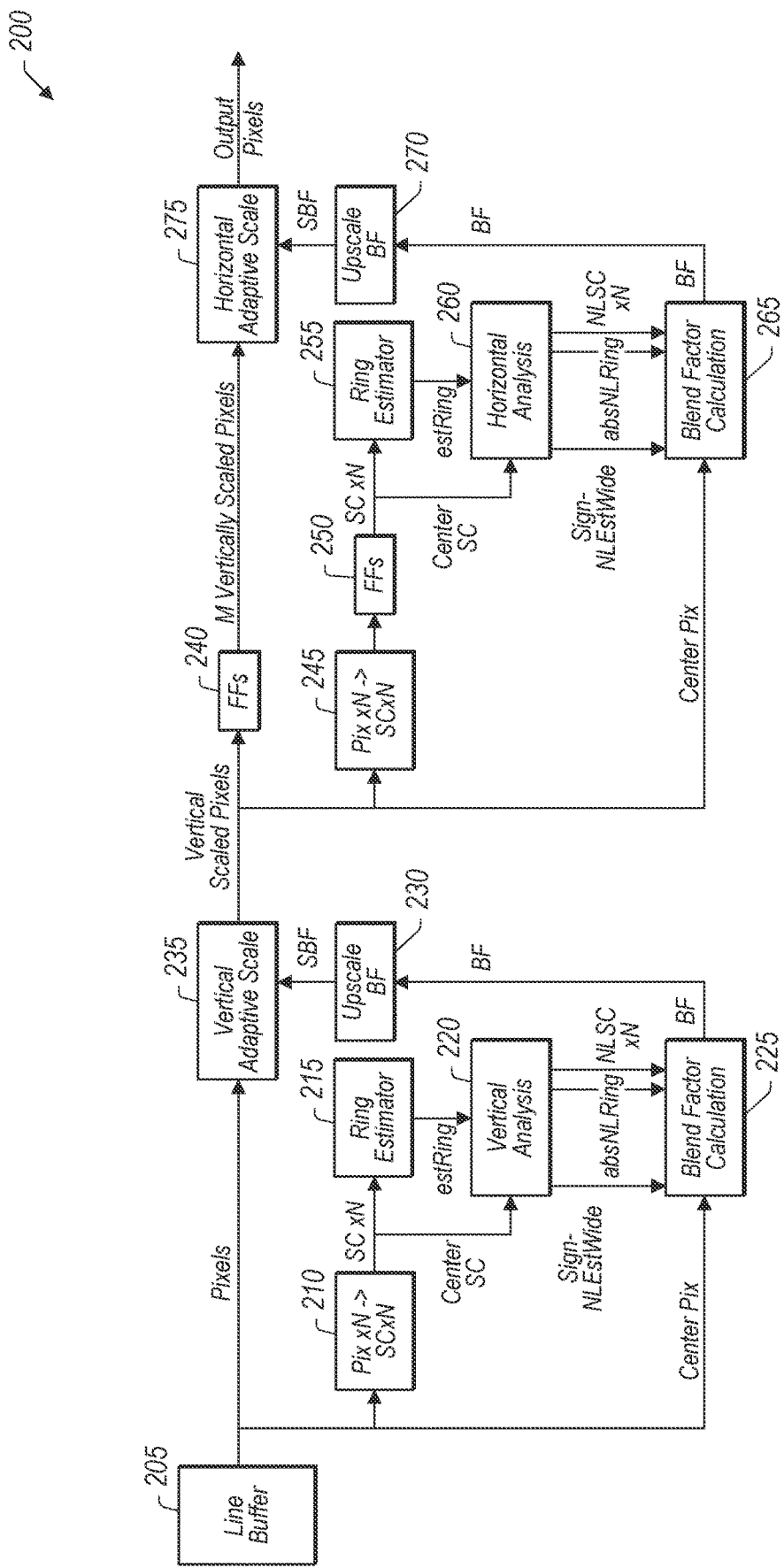
FIG. 2 is a block diagram of one implementation of an adaptive image scaling mechanism.

Turning now to FIG. 2, a block diagram of one implementation of a content adaptive image scaling mechanism 200 is shown. While content adaptive image scaling mechanism 200 is depicted as a scaling mechanism, it should be understood that this is merely one particular implementation. In other implementations, content adaptive image scaling mechanism 200 can employ other types of processing functions besides scaling functions.

In one implementation, input pixels are retrieved from line buffer 205 and provided to conversion unit 210. In one implementation, conversion unit 210 generates single channel (SC) data (e.g., a luminance channel) from the input pixel data. In one implementation, a set of matrices convert RGB pixel values into a single channel value of luminance or luma. Alternatively, the single channel can be the red, green, or blue channel for RGB pixel data, the single channel can be the Y, Cb, or Cr channel for YCbCr pixel data, or the single channel can represent other types of pixel components. In another implementation, rather than calculating the ring estimation for a single channel, the ring estimation is calculated for each of the R, G, and B channels. In this case, there will be three blend factors, with a separate blend factor for each R, G, and B output. Also, depending on the implementation, the color space in which the pixel data is represented can be the RGB color space, the YCbCr color space, or any of various other types of color spaces. The output of conversion unit 210 is provided to ring estimator 215 and vertical analysis unit 220.

Ring estimator 215 generates an estimate of the ringing (i.e., estRing) for the input pixels in the vertical direction and provides the ringing estimate to vertical analysis unit 220. The number "N" of pixels (i.e., SC xN) that are provided to ring estimator 215 can vary from implementation to implementation. In one implementation, ring estimator 215 generates an estimate of the amount of ringing (e.g., under-shoot ringing, over-shoot ringing) when a wide filter kernel is used for image reconstruction. In one implementation, ring estimator 215 generates the estimate of the largest positive or negative ring that scaling will produce for any of the N coefficient phases, where N is a positive integer. In one implementation, N is 64 and there are 64 taps. In other implementation, N can take on other values corresponding to other numbers of taps.

Vertical analysis unit 220 receives the center pixels and the ringing estimate and generates the sign of a non-linear version of the ringing estimate for a wide filter (i.e., Sign-NLEstWide), an absolute value of the non-linear ringing estimate (i.e., absNLRing), and non-linear single-channel pixel data (i.e., NLSC xN) which are provided to blend factor calculation unit 225. Based on the sign of the non-linear version of the ringing estimate for the wide filter, the absolute value of the non-linear ringing estimate, and the non-linear single-channel pixel data, blend factor calculation unit 225 determines if ringing is likely to be visually objectionable. Based on whether the ringing is likely to be visually objectionable, blend factor calculation unit 225 generates a blend factor which is upscaled by upscale unit 230 and then provided to vertical adaptive scaler 235. The blend factor is generated per set of source pixels to suppress any ringing which is predicted to be visually objectionable. In one implementation, when the blend factor is 0, only the narrow filter will be used, which yields no ringing. It is also possible in another implementation that the narrow filter will have some ringing which is desirable in some cases. In one implementation, when the blend factor is 1 (or the maximum value for other ranges besides 0-1), then only the wide filter is used, which provides the best image reconstruction quality when either ringing is below a threshold, ringing is desirable, or ringing is not visually objectionable. Other implementations can reverse the above described blend factor value designation and/or use other blend factor ranges.

In one implementation, vertical adaptive scaler 235 includes filter components which are similar to the components and structure of content adaptive image processing mechanism 100. For example, in one implementation, vertical adaptive scaler 235 includes a wide filter and a narrow filter, with the blend factor determining how much the wide filter is used versus the narrow filter. Generally speaking, if the ringing estimate is relatively low or desirable, then the blend factor will cause filtering to be biased toward the wide filter. Otherwise, if the ringing estimate is relatively high, and the ringing is deemed to be visually objectionable, the blend factor will be weighted toward the narrow filter. The outputs of the vertical adaptive scaler 235 are vertically scaled pixels which are provided to flip-flops 240 and conversion unit 245. In one implementation, conversion unit 245 generates a single channel from the vertically scaled pixels, with the single channel passing through flip-flops 250 and then to ring estimator 255 and horizontal analysis unit 260.

Ring estimator 255 generates an estimate of the ringing (i.e., estRing) in the horizontal direction. The ringing estimate is provided to horizontal analysis unit 260. Similar to the vertical analysis performed by vertical analysis unit 220, horizontal analysis unit 260 receives the center pixels and the ringing estimate and determines the sign of the non-linear ringing estimate for the wide filter, generates the absolute value of the non-linear ringing estimate, and provides the non-linear single-channel pixel data to blend factor calculation unit 265. Based on the sign of the non-linear ringing estimate for the wide filter, the absolute value of the non-linear ringing estimate, and the non-linear single-channel pixel data, blend factor calculation unit 265 generates a blend factor which is upscaled by upscale unit 270 and then provided to horizontal adaptive scaler 275. Horizontal adaptive scaler 275 uses the scaled blend factor (SBF) to determine how to balance filtering between a wide filter and a narrow filter. Horizontal adaptive scaler 275 generates output pixels which can undergo additional processing before being displayed or stored.

Figure 3:
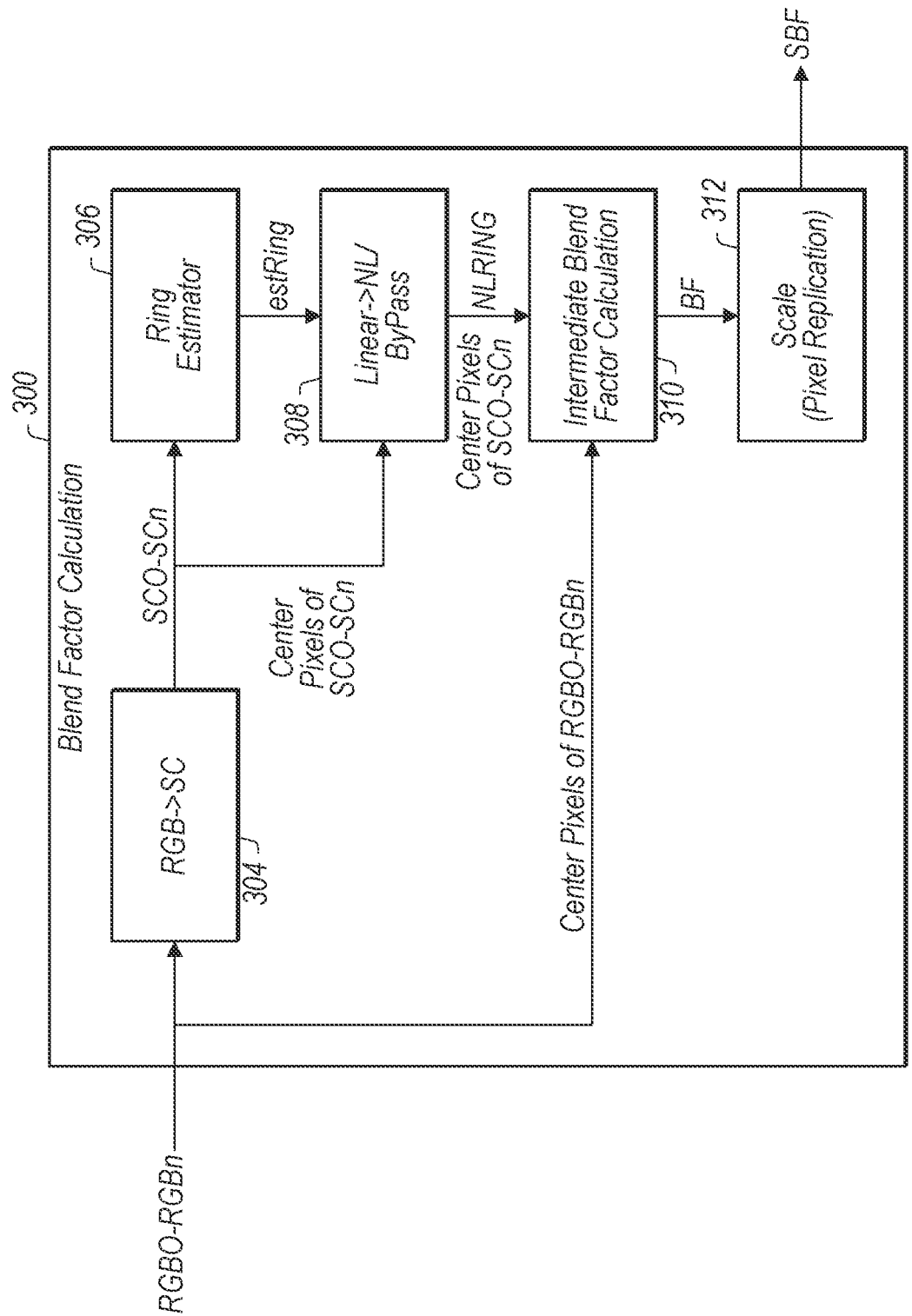
FIG. 3 is a block diagram of one implementation of a blend factor calculation unit.

Referring now to FIG. 3, a block diagram of one implementation of a blend factor calculation unit 300 is shown. Blend factor calculation unit 300 receives pixel data of an image or video frame. In some cases, blend factor calculation unit 300 receives a set of adjacent pixels per cycle from the image/frame. These adjacent pixels can be adjacent in the vertical direction or adjacent in the horizontal direction. In other cases, blend factor calculation unit 300 receives a block of pixels from the image/frame. In one implementation, the input pixel data is in the RGB color space. In other implementations, the input pixel data can be encoded in other color spaces. It is noted that blend factor calculation unit 300 can also be referred to herein as blend factor calculation circuit 300. It is also noted that the terms "unit" and "circuit" can be used interchangeably herein.

Figure 4:
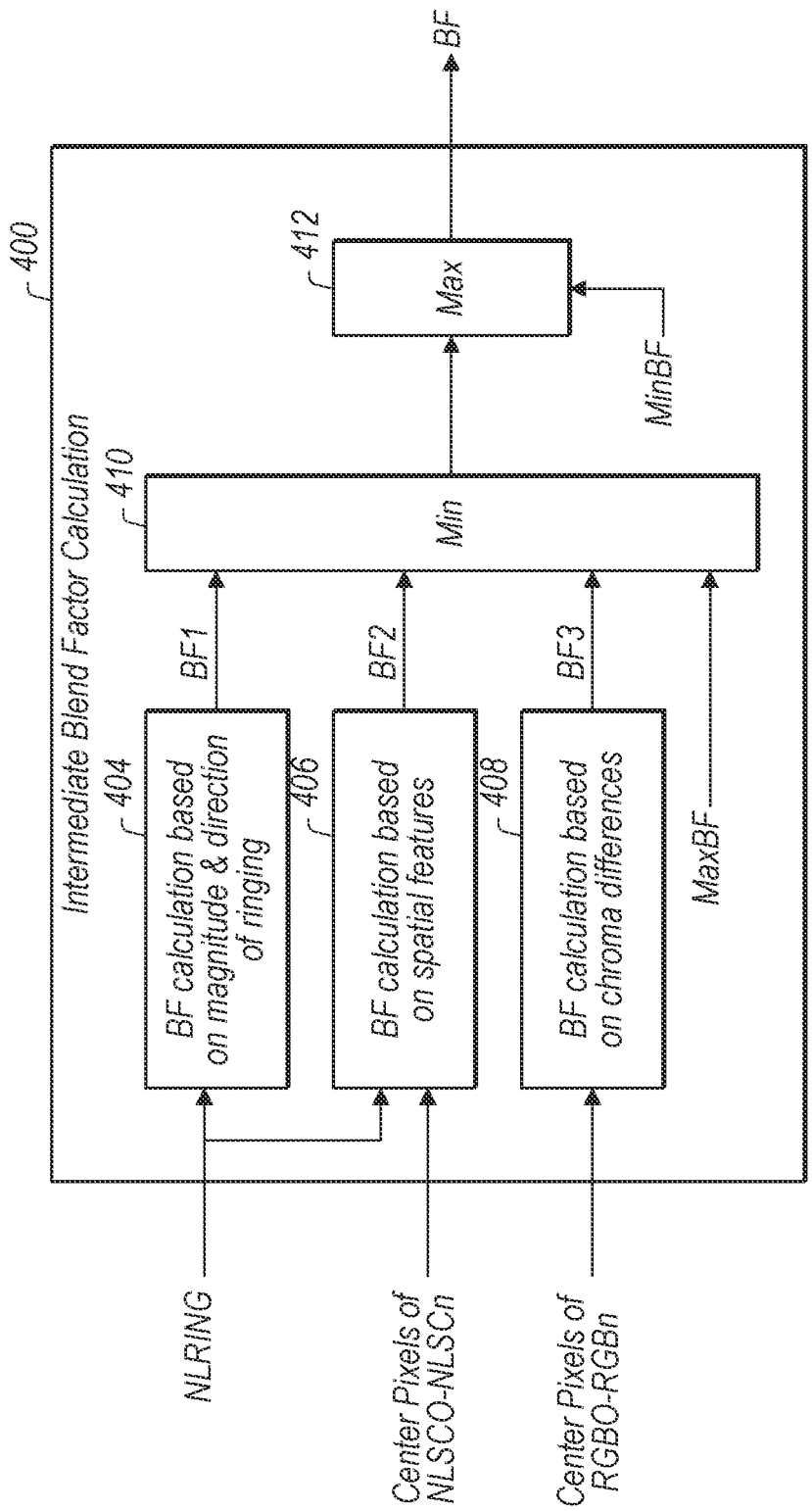
FIG. 4 is a block diagram of one implementation of an intermediate blend factor calculation unit.

As shown in FIG. 3, the input pixel data is coupled to single channel conversion unit 304 and intermediate blend factor calculation unit 310. In one implementation, intermediate blend factor calculation unit 310 receives a subset of the input pixels, with the subset being in the center of the input pixels. One example of an implementation of an intermediate blend factor calculation unit 310 is depicted in FIG. 4 and is described in further detail below. Single channel conversion unit 304 generates a single pixel channel from the input pixel data, with the single pixel channel coupled to ring estimator 306. In cases where the input pixels are already a single channel or in the correct format for subsequent processing, single channel conversion unit 304 can be a different type of conversion unit or a pass-through unit which passes the pixel values through unchanged.

The ring estimator 306 receives the single pixel channel data and based on the filter coefficients, a ringing estimate value is generated. The ring estimator 306 can operate in linear or non-linear space, depending on the implementation.

In one implementation, the ringing estimate value generated by ring estimator 306 is an indication of the overshoot or undershoot. The ringing estimate value is provided to linear-to-non-linear bypass unit 308 where the ringing estimate value is optionally converted into non-linear space. Linear-to-non-linear bypass unit 308 also receives the center pixels from single channel conversion unit 304. If the ringing estimate value generated by estimator 306 is already in non-linear space, then linear-to-non-linear bypass unit 308 passes the ringing estimate value through unchanged. The non-linear ring estimate value is provided to intermediate blend factor calculation unit 310. Intermediate blend factor calculation unit 310 generates a blend factor value from the non-linear ringing estimate value and the center pixels from the input pixel data. Different examples of how intermediate blend factor calculation unit 310 can generate the blend factor value are described in further detail below. The blend factor value is provided to scaler 312 which generates a scaled blend factor value. In one implementation, the scaled blend factor value generated by scaler 312 is used by content adaptive image processing mechanism 100 (of FIG. 1) to control blending between a narrow and wide filter so as to suppress visually objectionable ringing.

Turning now to FIG. 4, a block diagram of one implementation of an intermediate blend factor calculation unit 400 is shown. In one implementation, the components of intermediate blend factor calculation unit 400 are included in intermediate blend factor calculation unit 310 (of FIG. 3). In one implementation, a ring estimator (e.g., ring estimator 306 of FIG. 3) receives input pixel values and based on applying filter coefficients (of a wide filter) to the input pixel values, a ringing estimate value is generated. The non-linear ringing estimate value (or "NLRING") is created by converting the linear ringing estimate value generated by the ring estimator into non-linear space. The non-linear ringing estimate value is an estimate of the amount of ringing in non-linear space. Based on the non-linear ringing estimate value, a blend factor is generated to quantify how to balance filtering between a wide filter and a narrow filter. In one implementation, as part of generating a blend factor, an intermediate blend factor is calculated by intermediate blend factor calculation unit 400.

In one implementation, the intermediate blend factor calculation is partitioned into three parts. For example, in this implementation, first blend factor calculation unit 404 generates a first blend factor unit (or BF1), second blend factor calculation unit 406 generates a second blend factor unit (or BF2), and third blend factor calculation unit 408 generates a first blend factor unit (or BF3). In other implementations, the intermediate blend factor calculation is partitioned into other numbers of parts.

In one implementation, the first blend factor is generated by first blend factor calculation unit 404 by analyzing the magnitude and direction of the ringing. Generally speaking, the input to first blend factor calculation unit 404 is the amount and direction of ringing, and the output of first blend factor calculation unit 404 is the first blend factor which controls how much the wide filter is used versus the narrow filter. In one implementation, if the magnitude of the ringing is above a certain threshold (e.g., 80 in a 10-bit code), then the option exists to filter completely with the narrow filter. In one implementation, if the magnitude of the ringing is less than the threshold, then first blend factor calculation unit 404 uses the ringing magnitude to determine how much to blend toward the wide filter rather than the narrow filter. In one implementation, first blend factor calculation unit 404 uses a piece-wise linear function to generate the first blend factor.

In other implementations, first blend factor calculation unit 404 uses other types of transfer functions to generate the first blend factor.

In one implementation, second blend factor calculation unit 406 determines if there is a flat area in the image and ringing within the flat area, as opposed to ringing in a busy area where the ringing is not as noticeable. In one implementation, second blend factor calculation unit 406 analyzes the adjacent pixels to identify these kinds of patterns. In one implementation, second blend factor calculation unit 406 includes three different detection mechanisms. In other implementations, second blend factor calculation unit 406 includes other numbers of detection mechanisms. In one implementation, third blend factor calculation unit 408 detects ringing at the boundaries of vertical lines based on chroma differences. In other implementation, other types of blend factor calculations units can be employed.

Minimum selection unit 410 selects the smallest intermediate blend factor, limited by MaxBF, while maximum selection unit 412 clips the output of minimum selection unit 410 to MinBF. The output of maximum selection unit 412 is the blend factor (BF) which can be scaled by a scaler (e.g., scaler unit 312 of FIG. 3) and then provided to a content adaptive image processing mechanism (e.g., content adaptive image processing mechanism 100 (of FIG. 1)) to control the blending between wide and narrow filters.

Figure 5:
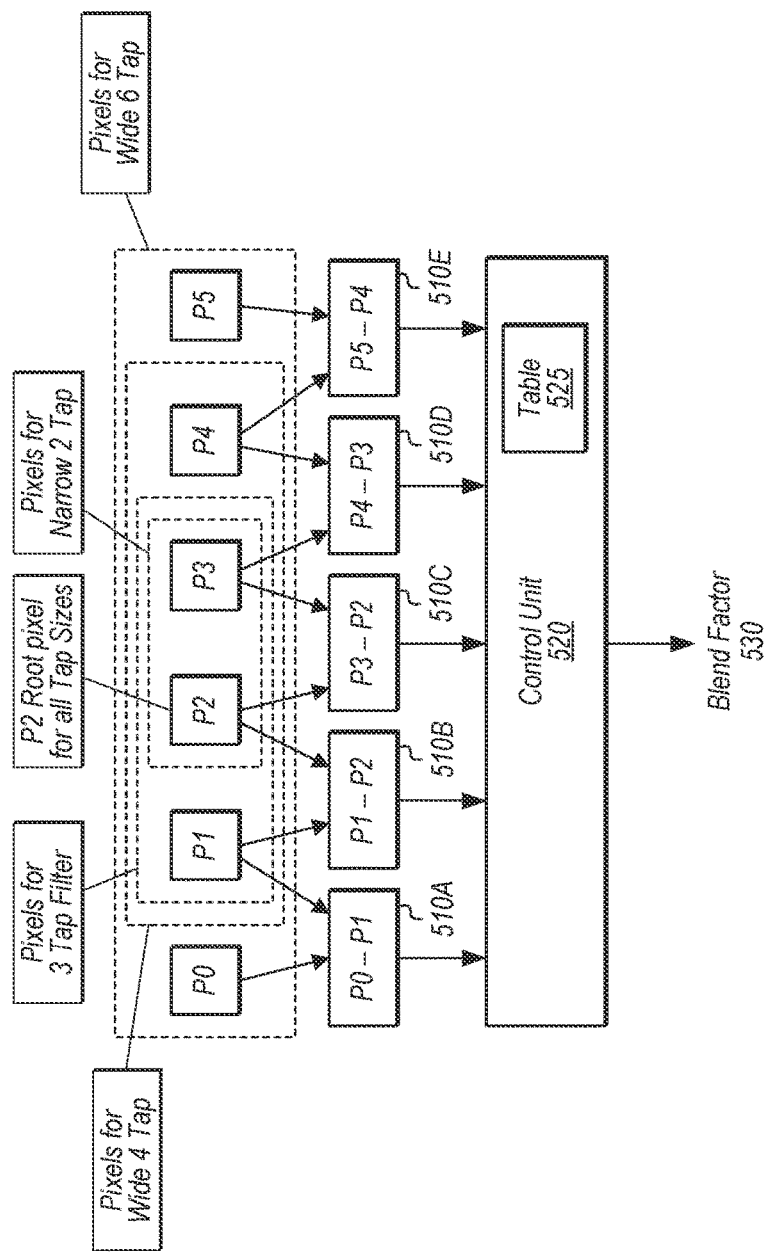
FIG. 5 is a block diagram of one implementation of a blend factor calculation unit.

Referring now to FIG. 5, a block diagram of one implementation of a blend factor calculation unit 500 is shown. In one implementation, blend factor calculation unit 500 includes adjacent pixel difference units 510A-E and control unit 520. Blend factor calculation unit 500 can also include other types of circuitry in other implementations. It is noted that control unit 520 can be implemented using any suitable combination of circuitry, processing elements, and/or program instructions. For example, in one implementation, control unit 520 is implemented in software (e.g., by processing elements executing program instructions). In another implementation, control unit 520 is implemented in hardware (e.g., with fixed-function circuitry (ASIC), with reprogrammable circuitry (FPGA)). In other implementations, control unit 520 is implemented using both hardware and software. It is noted that the example of six pixels being coupled to difference units 510A-E is merely indicative of one implementation. The number of pixels that are coupled to difference units and the number of difference units can vary according to the implementation.

In one implementation, control unit 520 receives the pixel difference values calculated by difference units 510A-E. For example, difference unit 510A calculates the difference between adjacent pixels P0 and P1, difference unit 510B calculates the difference between adjacent pixels P1 and P2, difference unit 510C calculates the difference between adjacent pixels P2 and P3, difference unit 510D calculates the difference between adjacent pixels P3 and P4, and difference unit 510E calculates the difference between adjacent pixels P4 and P5. In other implementations, the differences between other numbers of adjacent pixels are calculated and provided to control unit 520.

In one implementation, control unit 520 determines the maximum difference among the difference values calculated by difference units 510A-E. In one implementation, if the maximum difference, among the difference values, is calculated by difference unit 510C for the center two pixels P2 and P3, then control unit 520 generates a value of blend factor 530 which weights the blend factor toward the narrow filter. It is noted that in the example shown in FIG. 5, pixels P2 and P3 can be referred to as the "center pixels" or the "inner pixels".

In one implementation, control unit 520 uses the difference values generated by difference units 510A-E to perform one or more accesses to table 525 to retrieve values which are used to generate blend factor 530. In one implementation, pixels P0-P5 are single channel pixel values (e.g., luminance pixel values). In another implementation, pixels P0-P5 are one of the red, green, or blue pixel channel values. In other implementation, pixels P0-P5 can be other types of pixel component values. In one implementation, control unit 520 determines the maximum and minimum difference values from all of the difference values generated by difference units 510A-E. Then, control unit 520 performs an access to table 525 with the maximum difference value and control unit 520 performs an access to table 525 with the minimum difference value. The results retrieved from table 525 for the maximum and minimum difference values are combined to generate blend factor 530. In other implementations, control unit 520 uses other techniques to generate blend factor 530 based on the difference values generated by difference units 510A-E.

Figure 6:
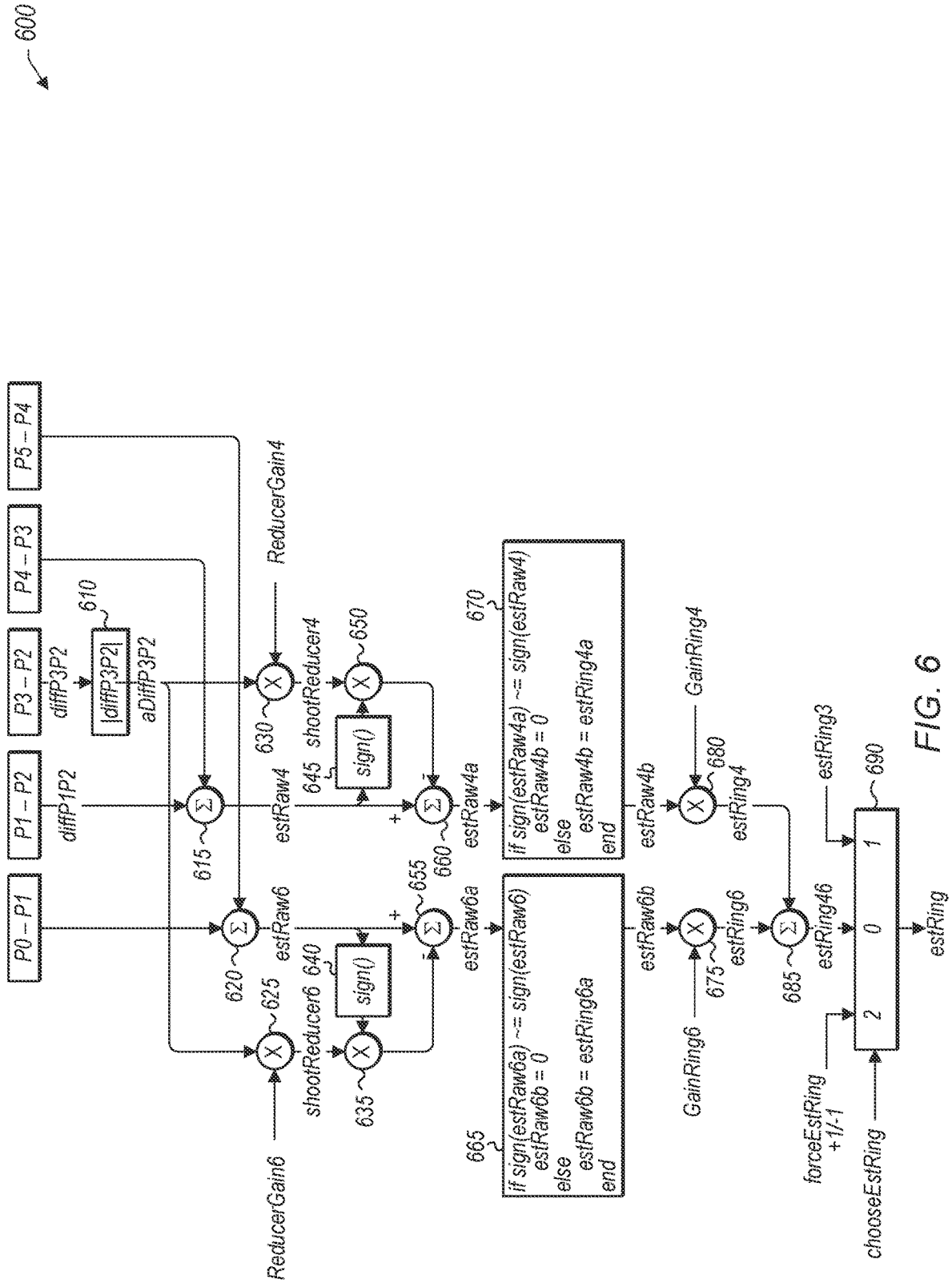
FIG. 6 is a block diagram of one implementation of a ring estimator.

Turning now to FIG. 6, a block diagram of one implementation of a ring estimator 600 is shown. In one implementation, at least a portion of the components of ring estimator 600 are included in control unit 520 of blend factor calculation unit 500 (of FIG. 5). In one implementation, ring estimator 600 receives six input pixels and computes the differences between adjacent pixels P0-P5 as shown at the top of FIG. 6. It should be understood that the example of ring estimator 600 is merely one possible implementation of a ring estimator in accordance with one implementation. In other implementations, other types of circuitry and structures are possible for other ring estimators.

The difference between P3 and P2 is calculated and shown as "diffP3P2" in FIG. 6. DiffP3P2 is the difference between the two center pixels in this example of a ring estimator 600 receiving six input pixels. In one implementation, the absolute value (aDiffP3P2) of the difference between pixels P3 and P2 is calculated by component 610. Then, aDiffP3P2 is coupled to multipliers 625 and 630 to be multiplied by a 6-tap reducer gain value (ReducerGain6) and a 4-tap reducer gain value (ReducerGain4), respectively. In one implementation, ReducerGain6 is equal to 2.5 and ReducerGain4 is equal to 2. In other implementations, ReducerGain6 and/or ReducerGain4 can be set equal to other values. In one implementation, ReducerGain6 and/or ReducerGain4 are tuned based on upscaling and/or downscaling ratios and are retrieved via a software lookup table. The ReducerGain6 and ReducerGain4 values are used to reduce the basic ring estimates estRaw4 and estRaw6. As the absolute difference of the center two pixels (i.e., P2 and P3) increases, the real ring is lower, so aDiffP3P2 is gained and used to reduce the raw estimates. The ReducerGain6 and ReducerGain4 values control the amount of this reduction. In one implementation, in the case when the center two pixels contain the minimum and maximum values of all four or six pixels, then the ring is zero for this case.

In one implementation, the difference between pixels P0 and P1 is added to the difference between pixels P5 and P4 by adder 620, and the difference between pixels P1 and P2 is added to the difference between pixels P4 and P3 by adder 615. The output of adder 620 is a raw estimate of the ringing for a 6-tap filter and is labeled "estRaw6", and the output of adder 615 is a raw estimate of the ringing for a 4-tap filter and is labeled "estRaw4". In one implementation, the sign of "estRaw6", which is determined by sign component 640, is coupled to multiplier 635. In one implementation, sign component 640 generates a value of −1 if estRaw6 is less than 0. Otherwise, sign component 640 generates a value of 1 if estRaw is greater than or equal to 0. The output of multiplier 625, labeled as "shootReducer6", is also coupled to multiplier 635. The output of multiplier 635 is subtracted from estRaw6 as represented by component 655, with the output of component 655 labeled as "estRaw6a". Block 665 includes pseudocode which shows how the sign of estRaw6b is flipped compared to estRaw6a based on if shootReducer6 flipped the sign of estRaw6a as compared to estRaw6. If shootReducer6 flipped the sign, then estRaw6b is set equal to 0, which indicates there is no ringing for the 6 input pixels. Otherwise, if shootReducer6 did not flip the sign, then block 665 passes through estRaw6a unchanged to become estRaw6b.

Similarly, the sign of "estRaw4", which is determined by sign component 645, is coupled to multiplier 650. The output of multiplier 630, labeled as "shootReducer4", is also coupled to multiplier 650. The output of multiplier 650 is subtracted from estRaw4 as indicated by component 660, with the output of component 660 labeled as "estRaw4a". Similar to block 665, block 670 includes pseudocode which shows how the sign of estRaw4b is flipped compared to estRaw4a based on if shootReducer4 flipped the sign of estRaw4a as compared to estRaw4. If shootReducer4 flipped the sign, then estRaw4b is set equal to 0, which indicates there is no ringing for the center 4 input pixels. Otherwise, if shootReducer4 did not flip the sign, then block 670 passes through estRaw4a unchanged to become estRaw4b.

In one implementation, estRaw6b and GainRing6 are coupled to multiplier 675, and estRaw4b and GainRing4 are coupled to multiplier 680. The GainRing4 and GainRing6 values are used to gain the large intermediate ring estimates estRaw4b and estRaw6b, respectively, by accurately incorporating the filter coefficient values. In one implementation, GainRing4 is calculated by looping over all possible phases (e.g., 64 phases) and summing, from each phase, any negative coefficients from the inner four coefficients. Then, the phase with the minimum sum is determined, and GainRing4 is set to half of the minimum sum of the determined phase. If GainRing4 is equal to 0 as a result of this process, then this indicates that there is no ringing contribution for the center four pixels. In one implementation, GainRing6 is calculated by negating the sum of the outer two coefficients over all possible phases. For 3 or 4 tap filters, GainRing6 can be set to 0, and the path through the 6 tap filter portion of ring estimator 600 can be disabled.

The output of multiplier 675 is the 6-tap ring estimate component (i.e., estRing6) and the output of multiplier 680 is the 4-tap ring estimate component (i.e., estRing4). Adder 685 adds estRing6 and estRing4 to generate the combined 4 and 6 tap ring estimate (i.e., estRing46). The select signal (i.e., chooseEstRing) selects which ring estimate is chosen as the output of multiplexer 690. Either the 4/6 tap ring estimate, 3-tap ring estimate (i.e., estRing3), or the forced ring estimate is chosen. One example of a 3-tap ring estimator used for generating the 3-tap ring estimate is illustrated in FIG. 7 and FIG. 8 and described in further detail below.

Figure 7:
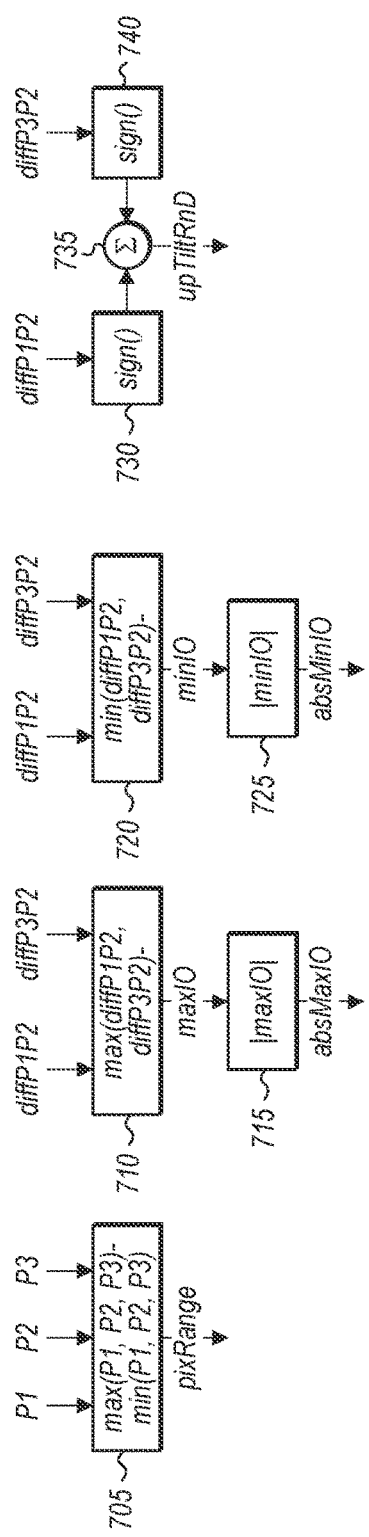
FIG. 7 is a block diagram of one implementation of a portion of a 3-tap ring estimator.

Referring now to FIG. 7, a block diagram of one implementation a portion 700 of a 3-tap ring estimator is shown. The pixel range (i.e., pixRange) of the input pixels P1, P2, and P3 is calculated by component 705. For example, pixRange is equal to the minimum pixel value of P1-P3 subtracted from the maximum pixel value of P1-P3. Also, the maximum pixel difference value (i.e., maxIO) is calculated by component 710 by taking the maximum difference value from the difference between P1 and P2 (i.e., diffP1P2) and the difference between P2 and P3 (i.e., diffP3P2). Component 715 computes the absolute value of maxIO which is labeled as "absMaxIO". Additionally, the minimum pixel difference value (i.e., minIO) is calculated by component 720 by taking the minimum difference value from diffP1P2 and diffP3P2. Component 725 computes the absolute value of minIO which is labeled as "absMinIO". Still further, the sign of diffP1P2 is computed by sign component 730 and the sign of diffP3P2 is computed by sign component 740. The sum of the sign of diffP1P2 and the sign of diffP3P2 is computed by adder 735, with the output of adder 735 labeled "upTiltRnD". These values calculated in portion 700 will be used by portion 800 of the 3-tap ring estimator which is illustrated in FIG. 8 and described in further detail below.

It is noted that portion 700 of a 3-tap ring estimator is one example of a front-end portion that can be employed in one implementation. In other implementations, other types of front-end portions of a 3-tap ring estimator with other components and other suitable structures can be used. It is also noted that the various components shown in portion 700 can be implemented using any suitable combination of circuitry and/or program instructions.

Figure 8:
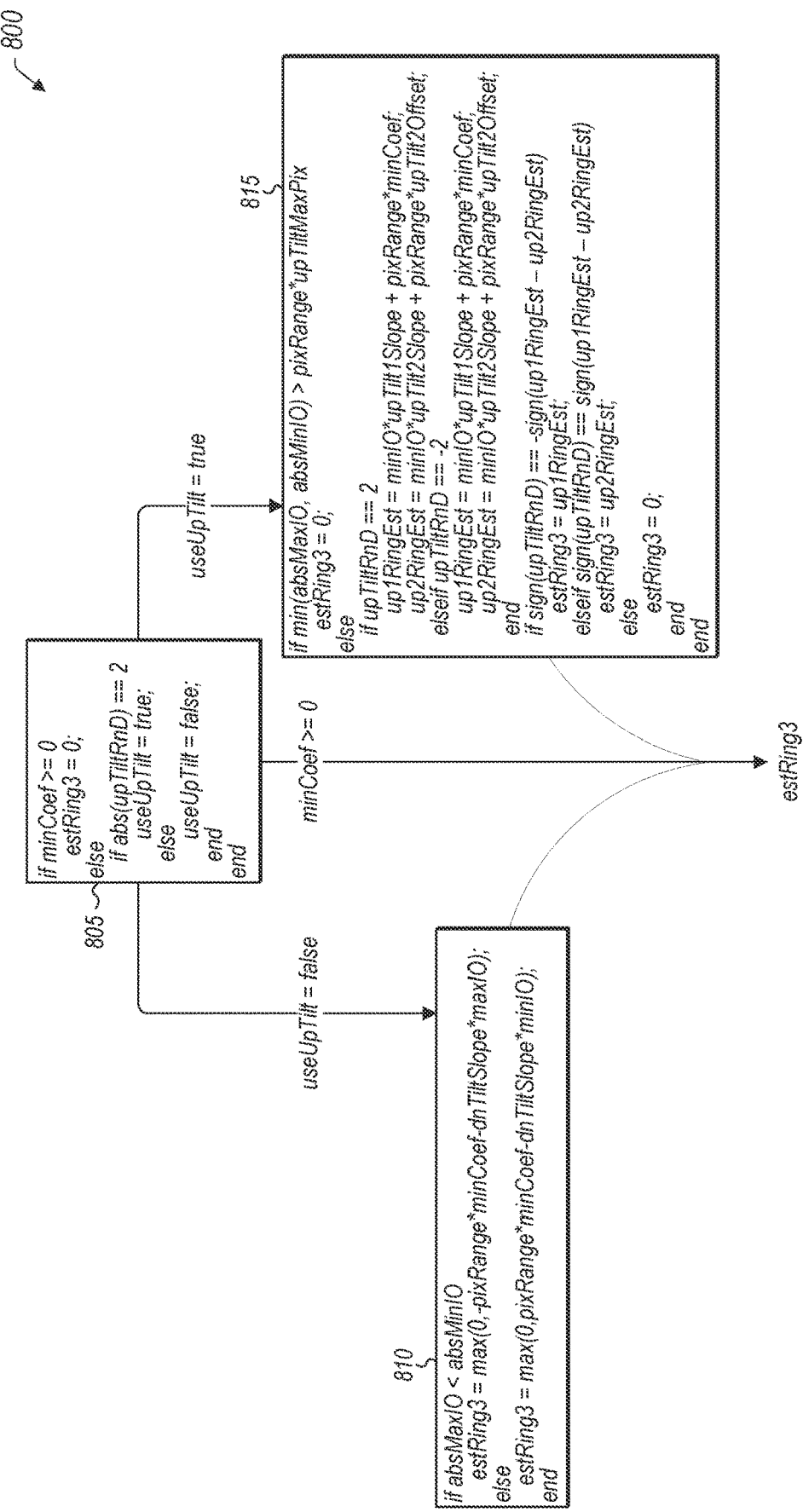
FIG. 8 is a block diagram of one implementation of a portion of a 3-tap ring estimator.

Turning now to FIG. 8, a block diagram of one implementation of a back-end portion 800 of a 3-tap ring estimator is shown. Block 805 includes pseudocode for setting the value of an up-tilt variable labeled as "useUpTilt". As shown in block 805, if the minimum coefficient (i.e., minCoef) is greater than or equal to zero, then the 3-tap ring estimate is set to 0. What this indicates is that if there are no negative coefficients, then the ring calculations are skipped and the ring estimate is set to 0. Otherwise, if there is at least one negative coefficient, then ring calculations are performed. If the absolute value of the upTiltRnD is equal to 2, then useUpTilt is set to true indicating that there is an estimated up tilt. Otherwise, if the absolute value of upTiltRnD is not equal to 2, then useUpTilt is set to false indicating that there is an estimated down tilt. There are three legs leading out of block 805 based on whether there are any negative coefficients and based on the value of useUpTilt.

The center leg leading out of block 805 represents the case when there are no negative coefficients with estRing3 being set to 0. Otherwise, if there is at least one negative coefficient, then the pseudocode in block 810 is used if useUpTilt is false. As shown in block 810, if absMaxIO is less than absMinIO, then the ring is greater than or equal to 0, and the estRing3 value is calculated as the maximum between 0 and the sum of two products—the first product is the negative pixel range multiplied by the minimum coefficient, and the second product is the negative down tilt slope multiplied by the maximum pixel difference. Otherwise, as shown in block 810, if absMaxIO is greater than or equal to absMinIO, then the ring is less than or equal to 0, and the estRing3 value is calculated as the maximum between 0 and the difference of two products—the first product is the pixel range multiplied by the minimum coefficient, and the second product is the down tilt slope multiplied by the minimum pixel difference.

If useUpTilt is true, then the pseudocode in block 815 is used. If the minimum of absMaxIO and absMinIO is greater than the product of the pixel range multiplied by the "upTiltMaxPix" variable, then the estRing3 value is set to 0. The upTiltMaxPix variable is generated as the maximum uptilt from the input pixel data. In one implementation, the upTiltMaxPix variable is adjusted by a gain based on the maximum expected input pixel value. In one implementation, the ratio of the most negative outer coefficient to the most positive outer coefficient in any phase determines the value of upTiltMaxPix that causes ringing. Otherwise, if upTiltRnD is equal to 2, then the variable "up1RingEst" is set equal to the minimum pixel difference multiplied by "upTilt1Slope" added to the product of the pixel range multiplied by the minimum coefficient. Also, the variable "up2RingEst" is set equal to the minimum pixel difference multiplied by "upTilt1Slope" added to the product of the pixel range multiplied by the variable "upTilt2Offset". If upTiltRnD is equal to −2, then up1RingEst is set equal to the product of the maximum pixel difference multiplied by upTilt1Slope subtracted by the product of the pixel range multiplied by the minimum coefficient. Also, when upTiltRnD is equal to −2, up2RingEst is set equal to the product of the maximum pixel difference multiplied by upTilt2Slope subtracted by the product of the pixel range multiplied by upTilt2Offset.

Next in the pseudocode of block 815, if the sign of upTiltRnD is equal to the negative of the sign of up2RingEst subtracted from up1RingEst, then estRing3 is set equal to up1RingEst. If the sign of upTiltRnD is equal to the sign of up2RingEst subtracted from up1RingEst, then estRing3 is set equal to up2RingEst. Otherwise, estRing3 is set equal to 0, indicating there is estimated to be no ring for the 3-tap filter. Only one of the three legs leading to estRing3 at the bottom of back-end portion 800 can be true, so estRing3 takes on the appropriate value according to whichever block is active.

Figure 9:
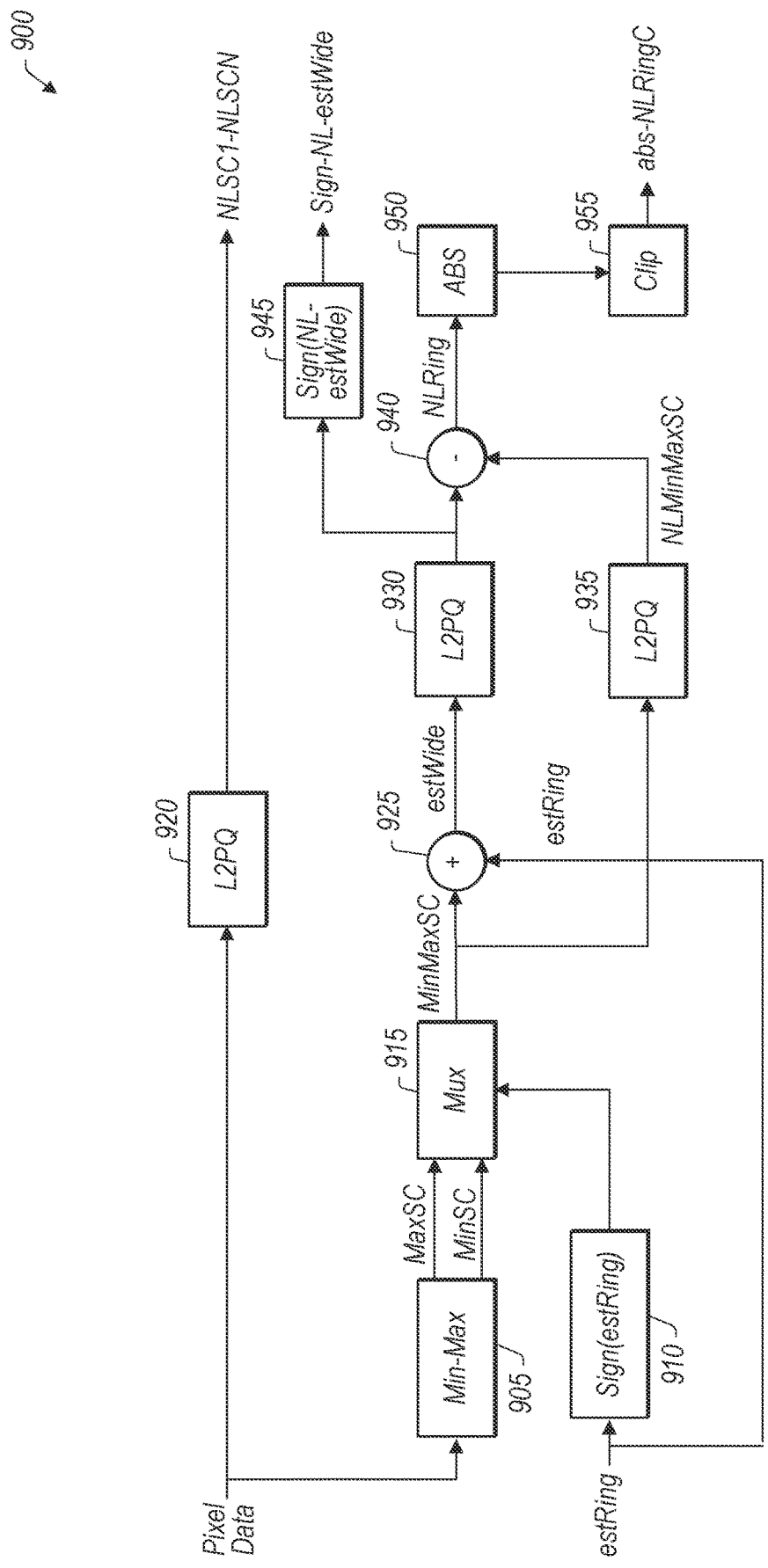
FIG. 9 is a block diagram of one implementation of an analysis unit.

Referring now to FIG. 9, a block diagram of one implementation of an analysis unit 900 is shown. In various implementations, analysis unit 900 can be employed as a vertical analysis unit and/or as a horizontal analysis unit by analyzing a vertical column of pixels and/or a horizontal row of pixels, respectively. Analysis unit 900 receives the pixel data and the ring estimate value (i.e., estRing). In one implementation, the pixel data is a single pixel channel of N pixels, where N is a positive integer which can vary according to filter width, design choice, or other factors. The pixel data is converted into perceptual quantization (PQ) space by linear-to-PQ converter 920.

Min-Max unit 905 calculates the maximum (i.e., MaxSC) and minimum (i.e., MinSC) pixel values for the source pixel data. Sign component 910 calculates the sign of estRing and then the sign is the select signal for multiplexer (mux) 915. In one implementation, if the sign of estRing is positive, the MaxSC value is passed through to the output of mux 915 while if the sign of estRing is negative, the MinSC value is passed through to the output of mux 915. The output of mux 915, labeled as "MinMaxSC" is coupled to adder 925 to be added with estRing. MinMaxSC is also converted to non-linear space by linear-to-PQ converter 935. The output of adder 925 is the estimated ring for the wide filter, which is labeled as "estWide", and is coupled to linear-to-PQ converter 930. The non-linear estimated ring for the wide filter is coupled to subtractor 940 and sign component 945. The non-linear MinMaxSC (or "NLMinMaxSC" is coupled to subtractor 940 and subtracted from non-linear estimated ring for the wide filter to generate the non-linear estimated ring (or "NLRing) which is coupled to absolute value component 950 and then potentially clipped (i.e., brought to one of the boundary values of the allowable range) by clip unit 955. The output of clip unit 955 is the absolute value of the non-linear ring estimate and is labeled as "abs-NLRingC". The output of sign component 945 is the sign of the non-linear ring estimate and is labeled as "Sign-NL-estWide". The signals (i.e., data values) generated by analysis unit 900 are provided to a blend factor calculation unit. One example of a blend factor calculation unit which receives the signals generated by analysis unit 900 is illustrated in FIG. 10 and described in further detail below.

Figure 10:
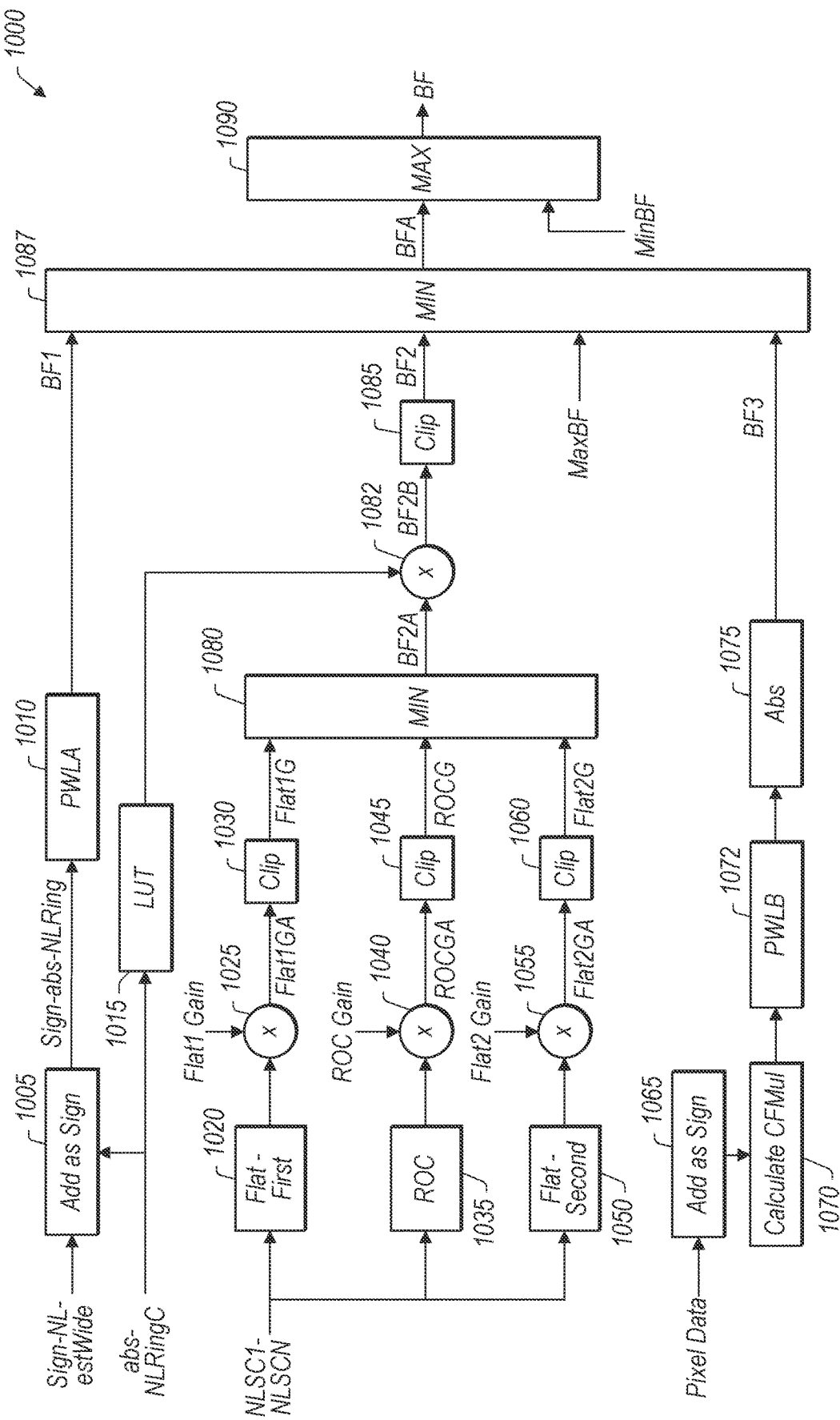
FIG. 10 is a block diagram of one implementation of an intermediate blend factor calculation unit.

Turning now to FIG. 10, a block diagram of one implementation of a blend factor calculation unit 1000 is shown. In one implementation, blend factor calculation unit 1000 receives the Sign-NL-estWide, abs-NLRingC, and NLSC1-N values from analysis unit 900 (of FIG. 9) and uses these values, and the original pixel data, to generate a blend factor (BF) which controls the blending between a plurality of filters (e.g., a wide filter and a narrow filter). It is noted that the components and structure depicted in FIG. 10 is merely indicative of one particular implementation. In other implementations, other components or connections can be added, one or more components or connections can be removed, and/or the structure can be altered in other suitable manners.

The Sign-NL-estWide value is received by concatenation component 1005 to be added as the sign value to the abs-NLRingC value. The concatenation of Sign-NL-estWide with abs-NLRingC, which is labeled as "Sign-abs-NLRing", is coupled to piecewise linear function A (PWLA) component 1010. In one implementation, PWLA component 1010 calculates the first intermediate blend factor component, labeled as "BF1", based on the magnitude of the ringing. One example of an implementation of PWLA component 1010 is shown in FIG. 12. The BF1 output of PWLA component 1010 is coupled to minimum selector component 1087. The abs-NLRingC value is coupled to lookup table (LUT) 1015, with the output of LUT 1015 coupled to multiplier 1082. Examples of the values stored in LUT 1015 are illustrated in table 1100 (of FIG. 11) in accordance with one particular implementation. Generally speaking, LUT 1015 converts small input values into large output values while converting large input values into small output values.

The non-linear single channel pixel data (NLSC1-N for "N" pixels, where N is a positive integer) is coupled to a first flat region detector 1020, rate of change (ROC) component 1035, and a second flat region detector 1050. First flat region detector 1020 and second flat region detector 1050 each perform calculations based on the non-linear single channel pixel data to determine if the pixel data indicates there is a flat region. As used herein, the term "flat region" is defined as a region of pixel data indicating relatively low amount of luminance/chrominance variance over the region. The region can be a vertical column, horizontal row, or block of pixel data. Ringing in a flat region is more discernible by a viewer and therefore more problematic, and so if the pixel data is indicative of a flat region, then ringing should be suppressed more aggressively. In other words, if the pixel data indicates the presence of a flat region, this means the perceptual impact of ringing is relatively greater. On the other hand, if the pixel data indicates the region is not a flat region, then the perceptual impact of ringing is relatively smaller.

In one implementation, the output of first flat region detector 1020 is generated by subtracting the minimum input pixel value from the maximum input pixel value. The difference between the maximum and minimum of the input pixel values is clipped in one implementation to keep the output of first flat region detector 1020 within a desired range. In one implementation, the output of second flat region detector 1050 is generated by taking the absolute value of the difference between the center pixel and a neighboring pixel. In one implementation, the neighboring pixel is the pixel to the right of the center pixel for a horizontal row of pixels. For example, in one implementation, the output of second flat region detector 1050 is generated based on the following equation: Flat2=abs (NLSC2−NLSC3) where NLSC2 is the center pixel value and the NLSC3 is the adjacent pixel to the center pixel. This equation can be adjusted for filters with other numbers of taps. The value of "Flat2" can be clipped to the desired range. In one implementation, the output of ROC component 1035 is generated based on the following equation: ROC=abs (2*NLSC2−NLSC1−NLSC3) for three input pixels. This equation can be adjusted for filters with other numbers of taps. Generally speaking, the center pixel is doubled and then the edge pixels are subtracted from the doubled center pixel to generate an estimate of the rate of change.

The outputs of first flat region detector 1020, ROC component 1035, and second flat region detector 1050 are coupled to multipliers 1025, 1040, and 1055, respectively, to be multiplied by the gain variables flat1 gain, ROC gain, and flat2 gain, respectively. The outputs of multipliers 1025, 1040, and 1055 are labeled as "Flat1GA", "ROCGA", and "Flat2GA", respectively, which are coupled to clip units 1030, 1045, and 1060, respectively. The outputs of clip units 1030, 1045, and 1060 are coupled to minimum selector component 1080 which selects the minimum value from signals labeled as "Flat1G", "ROCU", and "Flat2G". The output of minimum selector component 1080 is labeled as "BF2A" and is coupled to multiplier 1082 to be multiplied by the lookup result from LUT 1015 for the absolute value of the non-linear ring estimate.

The output of multiplier 1082, labeled as "BF2B" is coupled to clip unit 1085, with the output of clip unit 1085 the second intermediate blend factor component and labeled as "BF2". BF1, BF2, the third intermediate blend factor component "BF3", and "MaxBF" are coupled to minimum selector component 1087, which selects the minimum value from these inputs. MaxBF is the maximum allowable BF value. The output of minimum selector component 1087 is labeled as "BFA" and is coupled to maximum selector component 1090, which selects the maximum value from BFA and "MinBF". MinBF is the minimum allowable BF value. The output of maximum selector component 1090 is the blend factor value "BF" which controls the blending of filters which are used to generate a final pixel value by blending the outputs of multiple filters. BF3 is generated from the pixel data passing through add as sign adder 1065, to chroma fix (CFMul) calculation unit 1070, then through PWLB 1072 and absolute value component 1075.

Referring now to FIG. 11, one implementation of a LUT 1100 for converting non-linear ring estimates into values for modifying a second intermediate blend factor is shown. In one implementation, the values of LUT 1100 are stored in LUT 1015 (of FIG. 10) for 10-bit pixel values. For pixel values with other numbers of bits, the values of LUT 1100 can be adjusted to maintain similar ratios to what is shown in FIG. 11. Generally speaking, LUT 1100 converts relatively small input values into relatively large output values while converting relatively large input values into relatively small output values. Entries for input values 0-79 are shown in LUT 1100, while input values of greater than 79 will map to an output value of 1. While values are shown for each entry of LUT 1100, it should be understood that other implementations can use other values for one or more entries of LUT 1100. For example, with further simulation and testing, the values in LUT 1100 can be fine-tuned and adjusted so as to generate more suitable second intermediate blend factor values for suppressing perceptually objectionable ringing.

Turning now to FIG. 12, examples of tables 1210, 1220, and 1230 representing a piece-wise linear (PWL) function in accordance with one implementation are shown. Tables 1210, 1220, and 1230 represent portions of one implementation of PWLA 1010 (of FIG. 10). Table 1210 includes various pivot points for Sign-absNLRing, assuming a 10-bit field, and the corresponding BF1 values, assuming a 6-bit field. In other implementations, Sign-absNLRing and/or BF1 can have other numbers of bits. Tables 1220 and 1230 include examples of PWL input values and corresponding output points for the input ranges from (−10:0) and (17:27), respectively. It is noted that these values in tables 1210, 1220, and 1230 can be programmable allowing the values to be updated via software. The other individual output points for the other ranges can be calculated in a similar fashion to those values shown for tables 1220 and 1230. It is noted that the values in tables 1210, 1220, and 1230 are indicative of one particular implementation. In other implementations, tables 1210, 1220, and 1230 can have other values.

Figure 13:
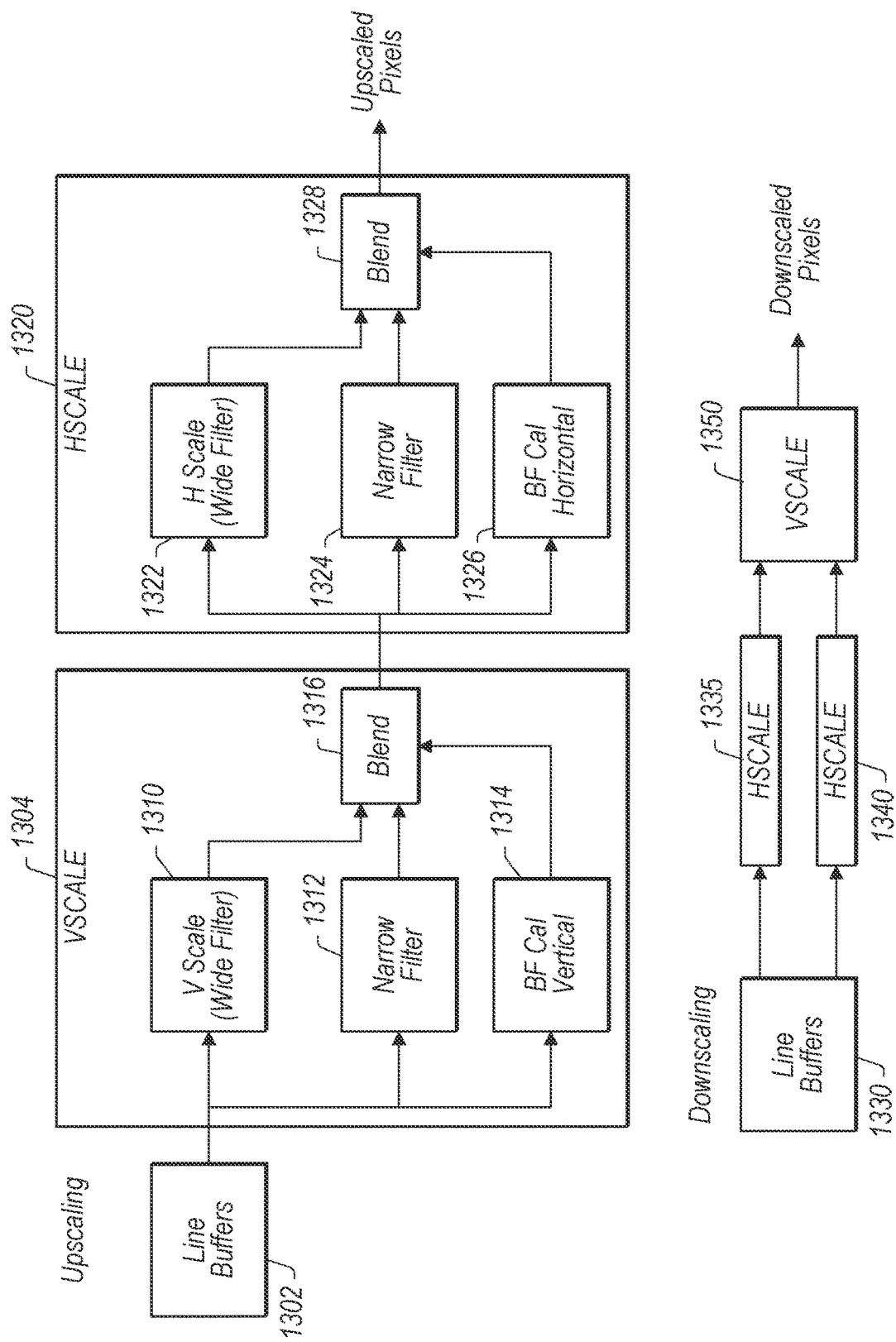
FIG. 13 illustrates block diagrams of vertical and horizontal scalers in accordance with one implementation.

Turning now to FIG. 13, block diagrams of vertical and horizontal scalers in accordance with one implementation are shown. The diagram at the top of FIG. 13 shows one example of an upscaler in accordance with at least one implementation. The source pixel data is stored in line buffers 1302 and provided to wide filter 1310, narrow filter 1312, and vertical blend factor calculation unit 1314 of vertical scaler 1304. Vertical blend factor calculation unit 1314 generates the blend factor which determines how much blend unit 1316 blends between the output of wide filter 1310 and narrow filter 1312. In one implementation, vertical blend factor calculation unit 1314 provides blend factors on a pixel-by-pixel basis.

Next, the vertically scaled pixels are provided to wide filter 1322, narrow filter 1324, and horizontal blend factor calculation unit 1326 of horizontal scaler 1320. Similar to the operation of vertical scaler 1304, horizontal blend factor calculation unit 1326 generates the horizontal blend factor which determines how much blend unit 1328 blends between the output of wide filter 1322 and narrow filter 1324. In one implementation, horizontal blend factor calculation unit 1326 provides blend factors on a pixel-by-pixel basis. The outputs of blend unit 1328 are upscaled pixels.

At the bottom of FIG. 13, a diagram of one implementation of a downscaler is shown. For downscaling, the pixels from line buffers 1330 are provided to dual horizontal scalers 1335 and 1340 and then to vertical scaler 1350. Horizontal scalers 1335 and 1340 and vertical scaler 1350 can operate in similar fashion to the horizontal scaler 1320 and vertical scaler 1304, respectively, of the upscaler. The outputs of vertical scaler 1350 are the downscaled pixels.

Figure 14:
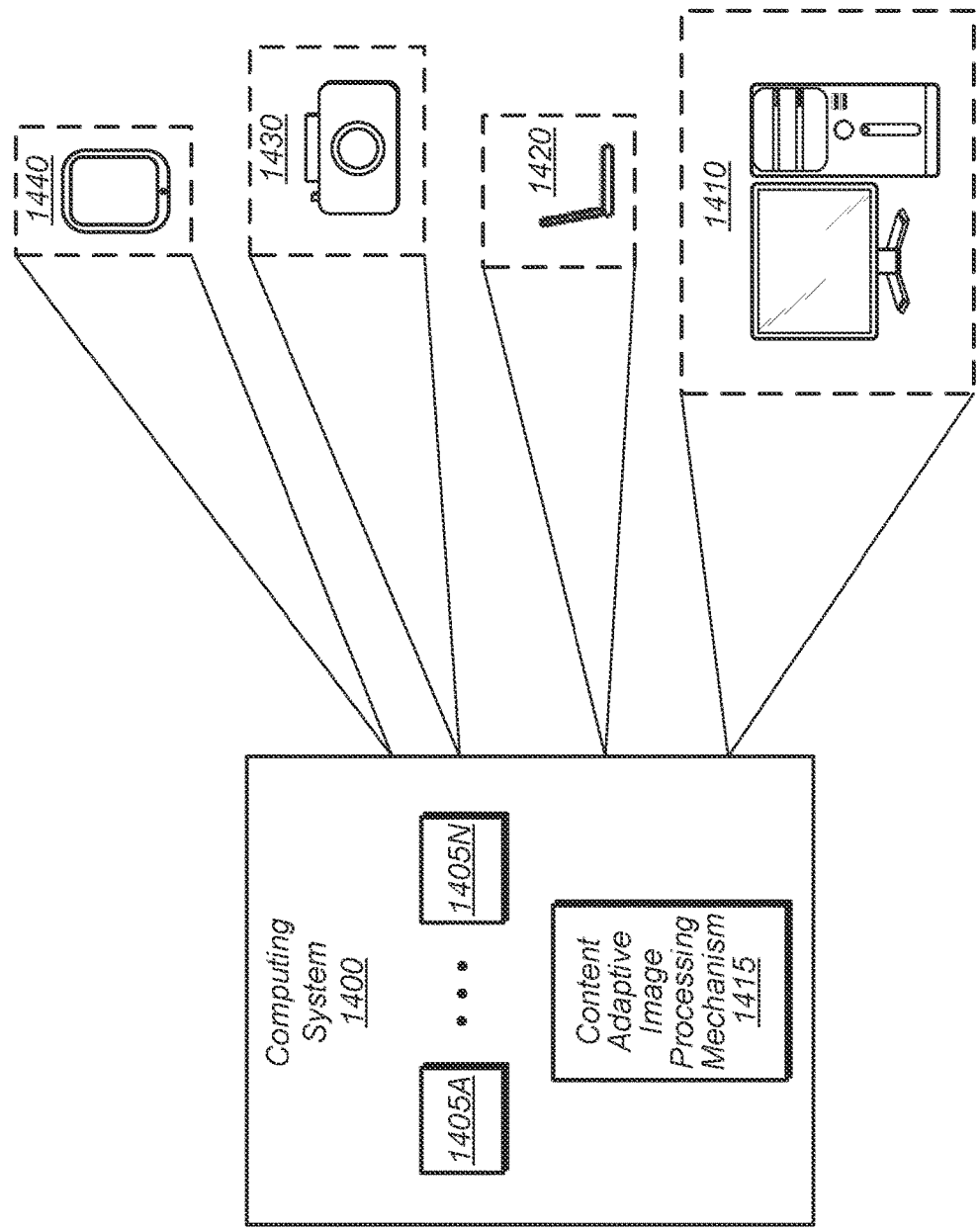
FIG. 14 is a block diagram of one implementation of a computing system.

Referring now to FIG. 14, a block diagram of one implementation of a computing system 1400 is shown. As shown, system 1400 represents chip, circuitry, components, etc., of a desktop computer 1410, laptop computer 1420, camera 1430, mobile device 1440, or otherwise. Other systems, devices, and apparatuses are possible and are contemplated. In the illustrated implementation, the system 1400 includes multiple components 1405A-N and at least one instance of content adaptive image processing mechanism 1415. Components 1405A-N are representative of any number and type of components, such as one or more processors, one or more memory devices, one or more peripheral devices, a display, and so on. Content adaptive image processing mechanism 1415 includes any of the circuit elements and components presented herein for processing pixel data in a content adaptive manner.

Figure 15:
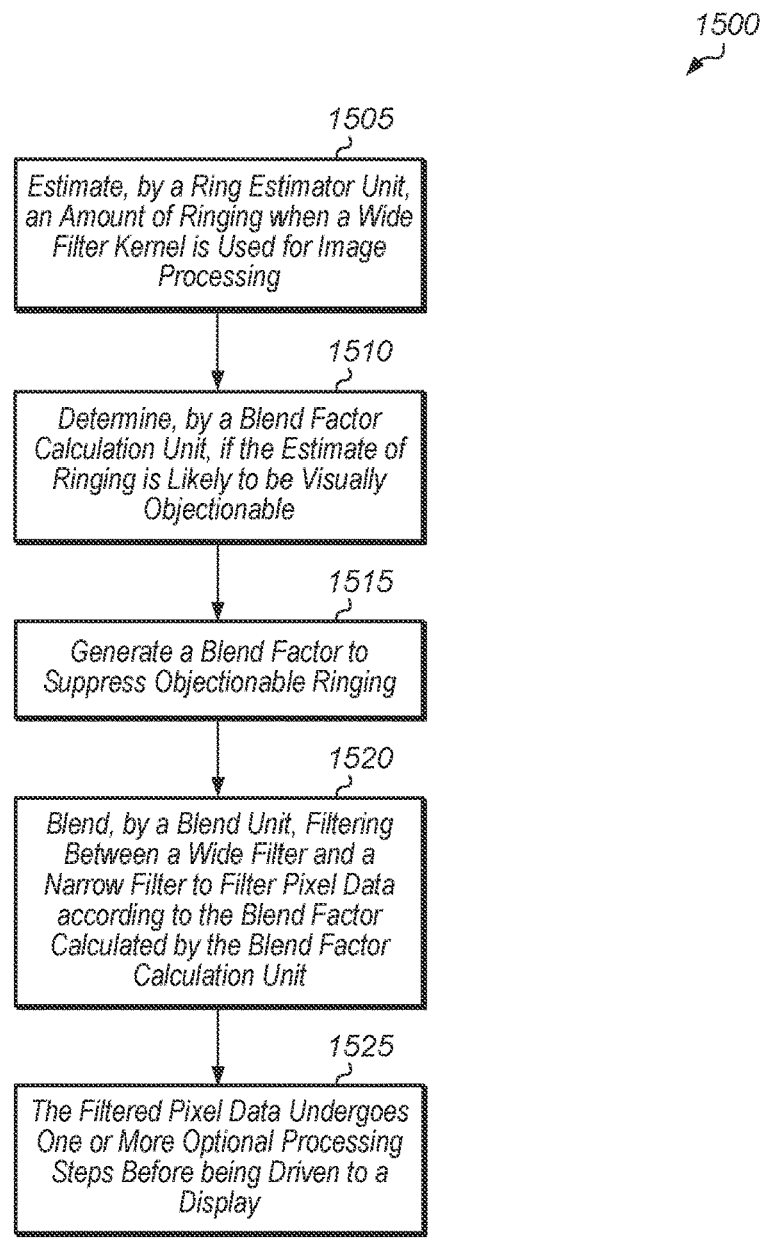
FIG. 15 is a generalized flow diagram illustrating one implementation of a method for estimating ringing and generating a blend factor corresponding to the ring estimate.

Turning now to FIG. 15, one implementation of a method 1500 for estimating ringing and generating a blend factor corresponding to the ring estimate is shown. For purposes of discussion, the steps in this implementation and those of FIG. 16-20 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1500 (and methods 1600-2000).

A ring estimator unit estimates an amount of ringing when a wide filter kernel is used for image processing (block 1505). In one implementation, the ring estimator unit calculates difference values between a plurality of pairs of adjacent pixel values. In this implementation, the ring estimator unit generates the estimate of the amount of ringing based on the difference values and the coefficients of the wide filter kernel. In other implementations, the ring estimator unit generates the estimate of the amount of ringing based at least in part on one or more other parameters.

A blend factor calculation unit determines if the estimate of ringing is likely to be visually objectionable (block 1510). Next, the blend factor calculation unit generates a blend factor to suppress objectionable ringing (block 1515). In one implementation, the blend factor calculation unit determines whether an area in which ringing occurs is a flat area or a busy area. For example, in one implementation, the blend factor calculation unit characterizes ringing as visually objectionable if the ringing occurs in a flat area. Otherwise, the blend factor calculation unit characterizes ringing as not visually objectionable if the ringing occurs in a busy area. In one implementation, the blend factor calculation unit generates a blend factor less than a threshold if the ringing is visually objectionable. Otherwise, in this implementation, the blend factor calculation unit generates a blend factor greater than the threshold if the ringing is not visually objectionable.

Then, a blend unit blends filtering between a wide filter and a narrow filter to filter pixel data according to the blend factor calculated by the blend factor calculation unit, (block 1520). Next, the filtered pixel data undergoes one or more optional processing steps and then is driven to a display (block 1525). After block 1525, method 1500 ends. In one implementation, the blend unit blends filtering toward the narrow filter when the blend factor is less than the threshold. In this implementation, the blend unit blends filtering toward the wide filter when the blend factor is greater than the threshold.

Figure 16:
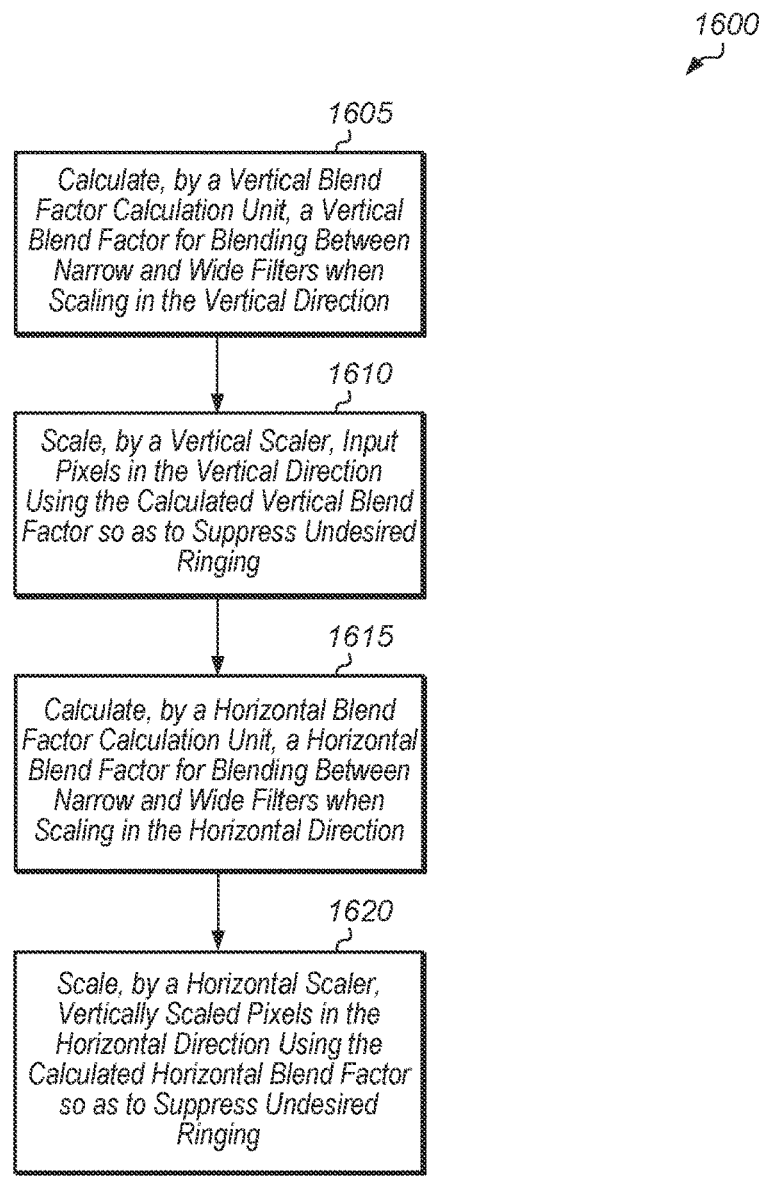
FIG. 16 is a generalized flow diagram illustrating one implementation of a method for generating vertical and horizontal blend factors.

Referring now to FIG. 16, one implementation of a method 1600 for generating vertical and horizontal blend factors is shown. A vertical blend factor calculation unit calculates a vertical blend factor for blending between narrow and wide filters when scaling in the vertical direction (block 1605). Next, a vertical scaler scales input pixels in the vertical direction using the calculated vertical blend factor so as to suppress undesired ringing (block 1610). Also, a horizontal blend factor calculation unit calculates a horizontal blend factor for blending between narrow and wide filters when scaling in the horizontal direction (block 1615). Next, a horizontal scaler scales the vertically scaled pixels (generated by the vertical scaler) in the horizontal direction using the calculated horizontal blend factor to suppress undesired ringing (block 1620). After block 1620, method 1600 ends.

The scaled pixels generated by the horizontal scaler can undergo further processing and then can be displayed and/or stored. It is noted that in another implementation, the horizontal scaling can be applied first and vertical scaling applied second.

Figure 17:
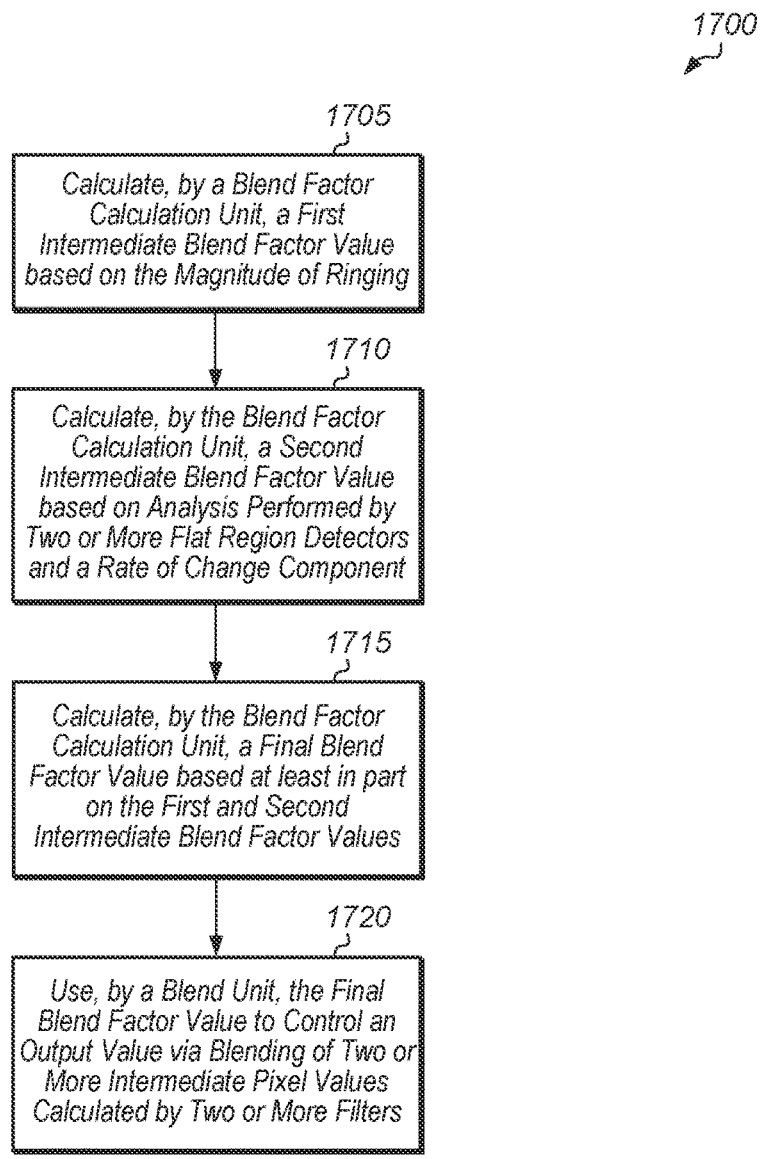
FIG. 17 is a generalized flow diagram illustrating one implementation of a method for generating intermediate blend factor values.

Turning now to FIG. 17, one implementation of a method 1700 for generating intermediate blend factor values is shown. A blend factor calculation unit (e.g., blend factor calculation unit 1000 of FIG. 10) calculates a first intermediate blend factor value (i.e., BF1) based on the magnitude of ringing (block 1705). In one implementation, the blend factor calculation unit receives the ring estimate and then generates the concatenation of Sign-NL-estWide with abs-NLRingC as shown in FIG. 10. The concatenation of Sign-NL-estWide with abs-NLRingC is labeled as "Sign-abs-NLRing" in FIG. 10. Then, the blend factor calculation unit provides Sign-abs-NLRing to a piecewise linear function (e.g., PWLA component 1010), with the output of the piecewise linear function being BF1.

Additionally, the blend factor calculation unit calculates a second intermediate blend factor value (i.e., BF2) based on analysis performed by two or more flat region detectors (e.g., first flat region detector 1020 and second flat region detector 1050) and a rate of change component (e.g., ROC component 1035) (block 1710). One example of implementing block 1710 is described in further detail below in method 1800 of FIG. 18. It is noted that in other implementations, the blend factor calculation unit can also calculate any number of other intermediate blend factor values which influence the final blend factor value.

Next, the blend factor calculation unit calculates a final blend factor value (e.g., BF) based at least in part on the first and second intermediate blend factor values (block 1715). Then, a blend unit uses the final blend factor value to control an output pixel value via blending of two or more intermediate pixel values calculated by two or more filters (block 1720). After block 1720, method 1700 ends.

Figure 18:
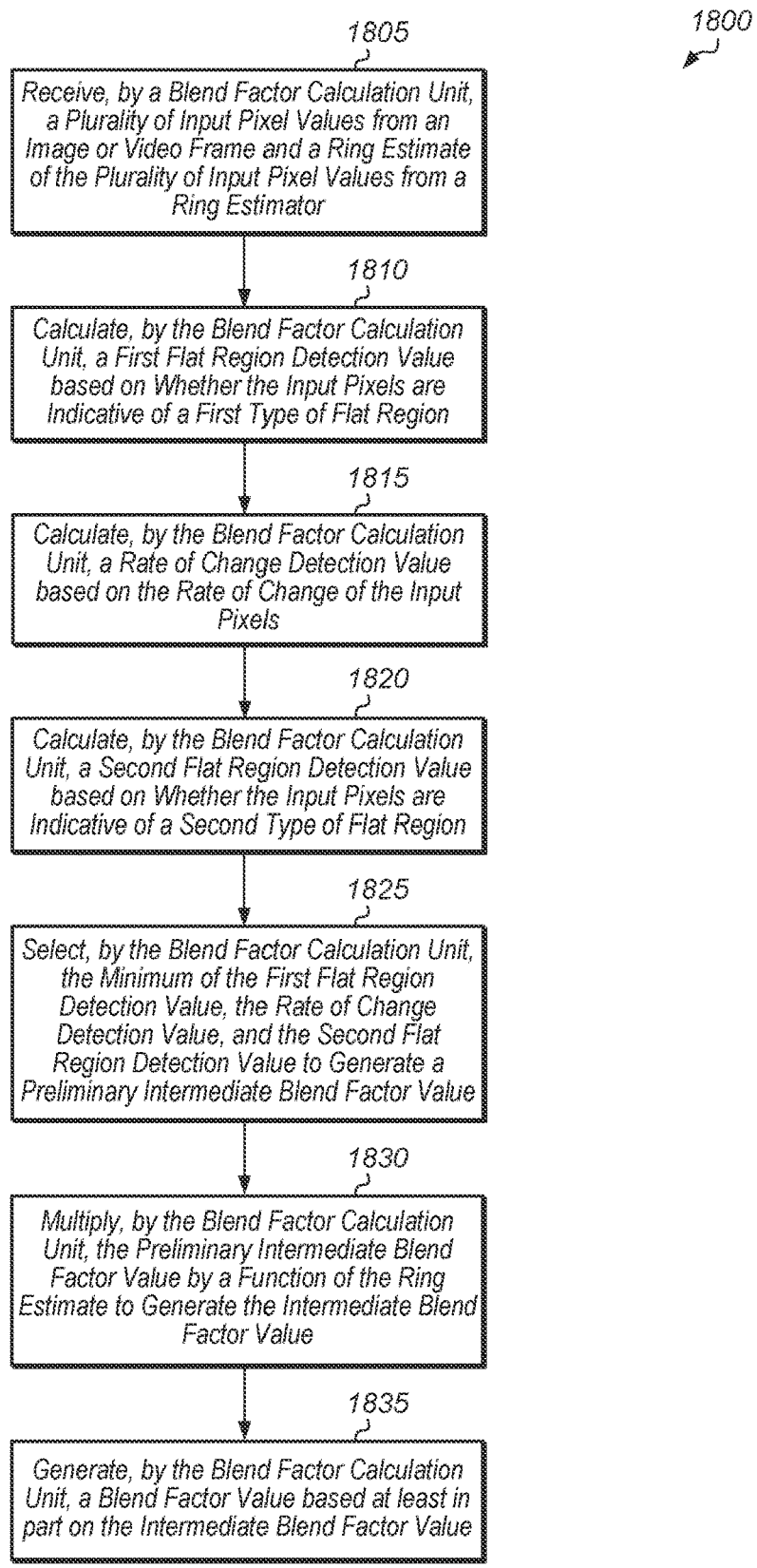
FIG. 18 is a generalized flow diagram illustrating one implementation of a method for calculating a second intermediate blend factor value.

Turning now to FIG. 18, one implementation of a method 1800 for calculating a second intermediate blend factor value is shown. A blend factor calculation unit (e.g., blend factor calculation unit 1000 of FIG. 10) receives a plurality of input pixel values from an image or video frame and a ring estimate of the plurality of input pixel values from a ring estimator (e.g., ring estimator 600 of FIG. 6) (block 1805). In one implementation, the ring estimate is converted into non-linear space prior to being provided to the blend factor calculation unit. The blend factor calculation unit calculates a first flat region detection value based on whether the input pixels are indicative of a first type of flat region (block 1810). In one implementation, the output of first flat region detector 1020 is generated by subtracting the minimum value from the input pixel values from the maximum value from the input pixel values. Also, the blend factor calculation unit calculates a rate of change detection value based on the rate of change of the input pixels (block 1815). In one implementation, the output of ROC component 1035 is generated based on the following equation: ROC=abs (2*NLSC2−NLSC1−NLSC3) for the center three pixels.

Additionally, the blend factor calculation unit calculates a second flat region detection value based on whether the input pixels are indicative of a second type of flat region (block 1820). In one implementation, the output of second flat region detector 1050 is generated based on the following equation: Flat2=abs(NLSC2−NLSC3) where NLSC2 is the center pixel value and the NLSC3 is the adjacent pixel to the right of the center pixel value. Next, the blend factor calculation unit selects the minimum of the first flat region detection value, the rate of change detection value, and the second flat region detection value to generate a preliminary intermediate blend factor value (e.g., BF2A of FIG. 10) (block 1825). Then, the blend factor calculation unit multiplies the preliminary intermediate blend factor value by a function of the ring estimate to generate the intermediate blend factor value (e.g., BF2 of FIG. 10) (block 1830). Next, the blend factor calculation unit generates a blend factor value based at least in part on the intermediate blend factor value (block 1835). For example, if the intermediate blend factor value is less than other intermediate blend factor values, then the blend factor value is set equal to the intermediate blend factor value. After block 1835, method 1800 ends.

Turning now to FIG. 19, one implementation of a method 1900 for suppressing ringing based on a measure of flatness for the region is shown. A blend factor calculation unit (e.g., blend factor calculation unit 1000 of FIG. 10) receives pixel data of an image/frame (block 1905). The blend factor calculation unit analyzes the pixel data to generate a measure of the flatness of the pixel data (block 1910). Next, the blend factor calculation unit generates a value of an intermediate blend factor which is inversely proportional to the measure of flatness (block 1915). Generally speaking, the greater the measure of flatness, the more ringing will be suppressed by the intermediate blend factor. In other words, the less the measure of flatness that is generated, the less ringing will be suppressed by the corresponding intermediate blend factor. After block 1915, method 1900 ends. As used herein, the term "flatness" when applied to pixel data or to a region of an image is defined as the luma differences between the adjacent pixel values. When a region is more flat, this means that ringing is more visible and more aggressive suppression of ringing should be employed.

Figure 20:
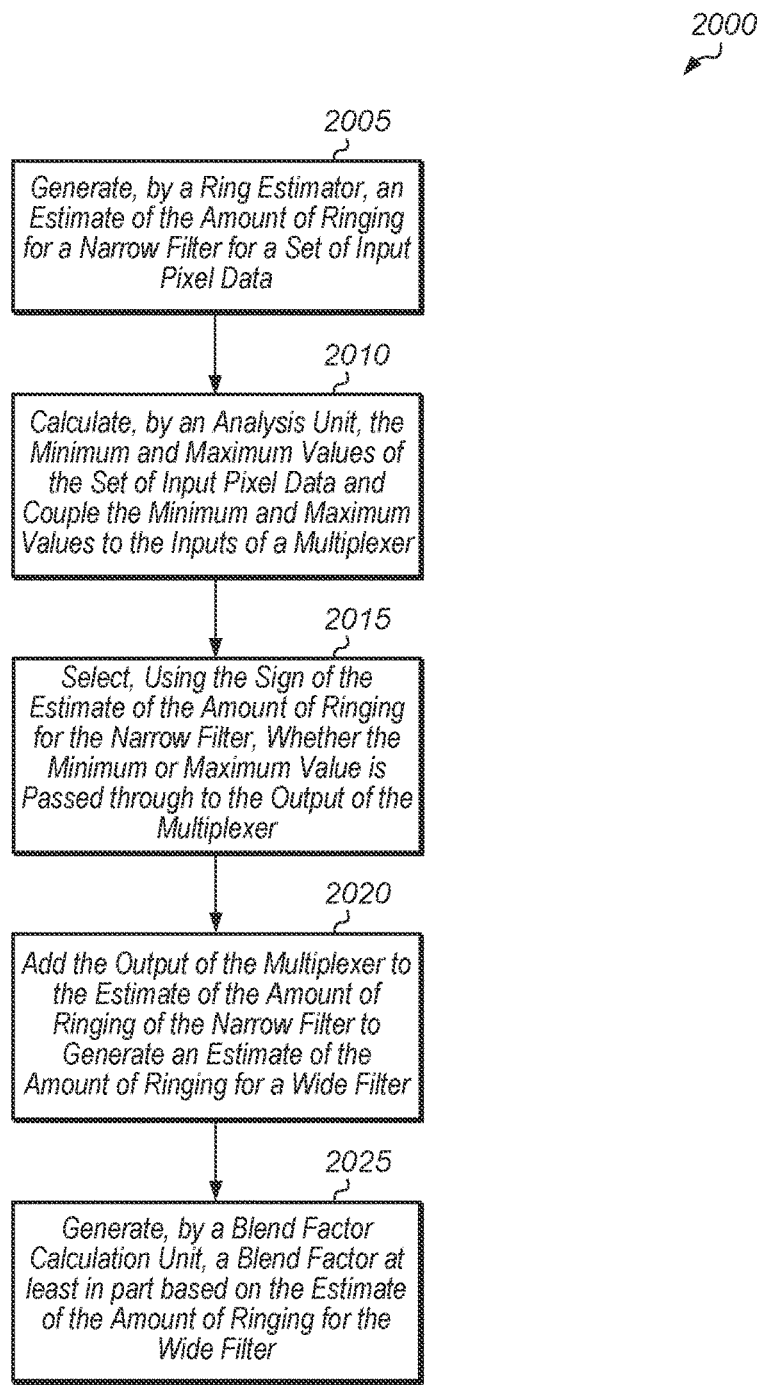
FIG. 20 is a generalized flow diagram illustrating one implementation of a method for generating an estimate of the amount of ringing for a wide filter.

Turning now to FIG. 20, one implementation of a method 2000 for generating an estimate of the amount of ringing for a wide filter is shown. A ring estimator (e.g., ring estimator 600 of FIG. 6) generates an estimate of the amount of ringing for a narrow filter for a set of input pixel data (block 2005). In one implementation, the estimate of the amount of ringing is generated based on the differences in values between adjacent pixels in the input pixel data. Also, the minimum and maximum values of the set of input pixel data are calculated by an analysis unit (e.g., analysis unit 900 of FIG. 9) and coupled to the inputs of a multiplexer (e.g., multiplexer 915) (block 2010). The sign of the estimate of the amount of ringing of the narrow filter selects whether the minimum or maximum value is passed through to the output of the multiplexer (block 2015). In one implementation, if the sign of the estimate of the amount of ringing is negative, which indicates an under-shoot, then the minimum value is passed through to the output of the multiplexer. In this implementation, if the sign of the estimate of the amount of ringing is positive, which indicates an over-shoot, then the maximum value is passed through to the output of the multiplexer.

The output of the multiplexer is added to the estimate of the amount of ringing of the narrow filter to generate an estimate of the amount of ringing for a wide filter (block 2020). Next, a blend factor (e.g., BF of FIG. 10) is generated by a blend factor calculation unit (e.g., blend factor calculation unit 1000) at least in part based on the estimate of the amount of ringing for the wide filter (block 2025). After block 2025, method 2000 ends. It is noted that in another implementation, one or more of the components described in method 2000 can be replaced with other types of components and/or program instructions executed by a processing unit.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. The implementations are applied for up-scaled, down-scaled, and non-scaled images. Numerous variations and modifications will become apparent to those skilled in the art once the above disclosure is fully appreciated. It is intended that the following claims be interpreted to embrace all such variations and modifications.

What is claimed is:

1. An apparatus comprising:
a ring estimator circuit comprising circuitry configured to estimate an amount of ringing in an image when filtering a set of pixel data of the image with a first filter, the ringing corresponding to visual artifacts in the image;
a blend factor calculation circuit comprising circuitry configured to:
generate a measure of flatness based on luma differences between adjacent pixel values for the set of pixel data;
generate a blend factor to suppress the ringing in the image based on the measure of flatness;
a blend circuit comprising circuitry configured to blend filtering of the set of pixel data between the first filter and a second filter based on the blend factor.

2. The apparatus as recited in claim 1, wherein the first filter is a wide filter with a relatively high number of taps, and wherein the second filter is a narrow filter with a relatively low number of taps, and wherein the blend factor calculation circuit is further configured to:
generate a value of an intermediate blend factor which is inversely proportional to the measure of flatness.

3. The apparatus as recited in claim 1, wherein the blend factor calculation circuit is further configured to:
calculate difference values between a plurality of pairs of adjacent pixel values from the set of pixel data.

4. The apparatus as recited in claim 1, wherein the blend factor calculation circuit is further configured to:
calculate a first intermediate blend factor value based on a magnitude of the estimated amount of ringing;
calculate a second intermediate blend factor value based on analysis performed by two or more flat region detectors and a rate of change component, wherein a flat region comprises a relatively low amount of luminance variance; and calculate the blend factor based at least in part on the first and second intermediate blend factors.

5. The apparatus as recited in claim 4, wherein the blend factor calculation circuit is further configured to:

calculate a first flat region detection value based on whether the set of pixel data is indicative of a first type of flat region;

calculate a rate of change detection value based on a rate of change of the set of pixel data;

calculate a second flat region detection value based on whether the set of pixel data is indicative of a second type of flat region;

select a minimum value of the first flat region detection value, rate of change detection value, and the second flat region detection value to generate a preliminary intermediate blend factor value;

multiply the preliminary intermediate blend factor value by a function of the estimated amount of ringing to generate an intermediate blend factor value; and generate the blend factor based at least in part on the intermediate blend factor value.

6. The apparatus as recited in claim 5, wherein the blend factor calculation circuit is further configured to:

calculate the first flat region detection value by subtracting a minimum value from the set of pixel data from a maximum value from the set of pixel data;

calculate the rate of change detection value by subtracting both neighboring pixels from double a center pixel; and calculate the second flat region detection value by taking an absolute value of a difference between the center pixel and a neighboring pixel from the set of pixel data.

7. The apparatus as recited in claim 1, wherein the ring estimator circuit is further configured to generate the estimate of the amount of ringing by calculating a largest positive or negative ring that filtering will produce for any of N coefficient phases, where N is a positive integer.

8. A method comprising:

estimating, by a ring estimator circuit, an amount of ringing in an image when filtering a set of pixel data of the image with a first filter, the ringing corresponding to visual artifacts in the image;

generating a measure of flatness based on luma differences between adjacent pixel values for the set of pixel data;

generating, by a blend factor calculation circuit, a blend factor to suppress the ringing in the image based on the measure of flatness; and blending, by a blend circuit, filtering of the set of pixel data between the first filter and a second filter according to the blend factor.

9. The method as recited in claim 8, further comprising:

generating, by the ring estimator circuit, an estimate of the amount of ringing for the second filter for the set of pixel data;

calculating, by an analysis circuit, minimum and maximum values of the set of pixel data;

selecting, using a sign of the estimate of the amount of ringing for the second filter, the minimum or maximum value; and adding the selected minimum or maximum value to the estimate of the amount of ringing for the second filter to generate the estimate of the amount of ringing for the first filter.

10. The method as recited in claim 8, further comprising:

generating, by the blend factor calculation circuit, a measure of flatness based on luma differences between adjacent pixel values for the set of pixel data;

generating a value of an intermediate blend factor which is inversely proportional to the measure of flatness.

11. The method as recited in claim 8, further comprising:

calculating, by the blend factor calculation circuit, difference values between a plurality of pairs of adjacent pixel values from the set of pixel data.

12. The method as recited in claim 8, further comprising to:

calculating, by the blend factor calculation circuit, a first intermediate blend factor value based on a magnitude of the estimated amount of ringing;

calculating a second intermediate blend factor value based on analysis performed by two or more flat region detectors and a rate of change component, wherein a flat region comprises a relatively low amount of luminance variance; and calculating the blend factor based at least in part on the first and second intermediate blend factors.

13. The method as recited in claim 12, further comprising:

calculating a first flat region detection value based on whether the set of pixel data is indicative of a first type of flat region;

calculating a rate of change detection value based on a rate of change of the set of pixel data;

calculating a second flat region detection value based on whether the set of pixel data is indicative of a second type of flat region;

selecting a minimum value of the first flat region detection value, rate of change detection value, and the second flat region detection value to generate a preliminary intermediate blend factor value;

multiplying the preliminary intermediate blend factor value by a function of the estimated amount of ringing to generate an intermediate blend factor value; and generating the blend factor based at least in part on the intermediate blend factor value.

14. The method as recited in claim 13, further comprising:

calculating the first flat region detection value by subtracting a minimum value from the set of pixel data from a maximum value from the set of pixel data;

calculating the rate of change detection value by subtracting both neighboring pixels from double a center pixel; and calculating the second flat region detection value by taking an absolute value of a difference between the center pixel and a neighboring pixel from the set of pixel data.

15. A system comprising:

circuitry configured to:

estimate an amount of ringing in an image when filtering a set of pixel data with a first filter, the ringing corresponding to visual artifacts in the image;

generate a measure of flatness based on luma differences between adjacent pixel values for the set of pixel data;

generate a blend factor to suppress the ringing in the image based on the measure of flatness; and blend filtering of the set of pixel data between the first filter and a second filter according to the blend factor.

16. The system as recited in claim 15, wherein the circuitry is further configured to:

generate a value of an intermediate blend factor which is inversely proportional to the measure of flatness.

17. The system as recited in claim 15, wherein the circuitry is further configured to:
  calculate difference values between a plurality of pairs of adjacent pixel values from the set of pixel data.

18. The system as recited in claim 15, wherein the circuitry is further configured to:
  calculate a first intermediate blend factor value based on a magnitude of the estimated amount of ringing;
  calculate a second intermediate blend factor value based on analysis performed by two or more flat region detectors and a rate of change component, wherein a flat region comprises a relatively low amount of luminance variance; and
  calculate the blend factor based at least in part on the first and second intermediate blend factors.

19. The system as recited in claim 18, wherein the circuitry is further configured to:
  calculate a first flat region detection value based on whether the set of pixel data is indicative of a first type of flat region;
  calculate a rate of change detection value based on a rate of change of the set of pixel data;
  calculate a second flat region detection value based on whether the set of pixel data is indicative of a second type of flat region;
  select a minimum value of the first flat region detection value, rate of change detection value, and the second flat region detection value to generate a preliminary intermediate blend factor value;
  multiply the preliminary intermediate blend factor value by a function of the estimated amount of ringing to generate an intermediate blend factor value; and
  generate the blend factor based at least in part on the intermediate blend factor value.

20. The system as recited in claim 19, wherein the circuitry is further configured to:
  calculate the first flat region detection value by subtracting a minimum value from the set of pixel data from a maximum value from the set of pixel data;
  calculate the rate of change detection value by subtracting both neighboring pixels from double a center pixel; and
  calculate the second flat region detection value by taking an absolute value of a difference between the center pixel and a neighboring pixel from the set of pixel data.

* * * * *